US012725934B2

(12) United States Patent
Fujii

(10) Patent No.: US 12,725,934 B2
(45) Date of Patent: Sep. 1, 2026

(54) ANTENNA DEVICE, POWER FEEDING APPARATUS, AND POWER FEEDING METHOD

(71) Applicant: MINEBEA MITSUMI Inc., Nagano (JP)

(72) Inventor: Masaaki Fujii, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 34 days.

(21) Appl. No.: 19/103,915

(22) PCT Filed: Aug. 24, 2023

(86) PCT No.: PCT/JP2023/030549

§ 371 (c)(1),
(2) Date: Feb. 14, 2025

(87) PCT Pub. No.: WO2024/053417

PCT Pub. Date: Mar. 14, 2024

(65) Prior Publication Data

US 2026/0051666 A1 Feb. 19, 2026

(30) Foreign Application Priority Data

Sep. 5, 2022 (JP) ................................ 2022-140825

(51) Int. Cl.
*H02J 50/20* (2016.01)
*H01Q 3/30* (2006.01)
(Continued)

(52) U.S. Cl.
CPC ............... *H01Q 21/06* (2013.01); *H01Q 3/30* (2013.01); *H01Q 13/08* (2013.01); *H02J 50/23* (2016.02); *H02J 50/90* (2016.02)

(58) Field of Classification Search
CPC .......... H02J 50/70; H02J 50/23; H02J 50/402; H02J 50/80; H02J 50/90; H02J 50/20;
(Continued)

(56) References Cited

U.S. PATENT DOCUMENTS

2013/0222204 A1* 8/2013 Binzer ............... H01Q 21/0075 343/853
2014/0253029 A1* 9/2014 Uchida .................. H02J 50/12 320/108

(Continued)

FOREIGN PATENT DOCUMENTS

JP 2019-083648 5/2019

OTHER PUBLICATIONS

International Search Report of PCT/JP2023/030549 mailed on Nov. 7, 2023.

(Continued)

*Primary Examiner* — Ryan Johnson
*Assistant Examiner* — Esayas G Yeshaw
(74) *Attorney, Agent, or Firm* — IPUSA, PLLC

(57) ABSTRACT

An antenna device includes circuitry configured to determine a first distance between a marker center and a fisheye lens, based on a first elevation angle and a coordinate of a marker along a third axis, determine second distances between the fisheye lens, and first endpoints and second endpoints, and control phase adjustment amounts by which phase shifters adjust phases of power transmission signals in a first axis direction and a second axis direction. The circuitry is configured to set phase adjustment amounts for three antenna elements including antenna elements at both ends in the first axis direction and for three antenna elements including antenna elements at both ends in the second axis direction, based on path differences between the first distance and the second distances, and set phase adjustment amounts for a plurality of antenna elements arranged two-dimensionally by parabolic interpolation of a quadratic function.

8 Claims, 10 Drawing Sheets

(51) Int. Cl.
*H01Q 13/08* (2006.01)
*H01Q 21/06* (2006.01)
*H02J 50/23* (2016.01)
*H02J 50/90* (2016.01)

(58) Field of Classification Search
CPC .. G06T 7/246; G06T 7/50; G06T 7/73; G06T 2207/30204; G06T 2207/30244; H01Q 3/36; H01Q 3/30; H01Q 21/06
See application file for complete search history.

(56) References Cited

U.S. PATENT DOCUMENTS

| | | | | |
|---|---|---|---|---|
| 2015/0045091 | A1* | 2/2015 | Nakatani | H04B 5/26 455/556.1 |
| 2016/0240934 | A1* | 8/2016 | Sato | H01Q 13/20 |
| 2016/0248159 | A1* | 8/2016 | Shiozaki | H01Q 13/206 |
| 2019/0252795 | A1* | 8/2019 | Murata | H01Q 9/0457 |
| 2019/0341812 | A1* | 11/2019 | Arnstein | H02J 50/20 |

OTHER PUBLICATIONS

Written Opinion of the International Searching Authority for PCT/JP2023/030549 mailed on Nov. 7, 2023.

* cited by examiner

FIG.1

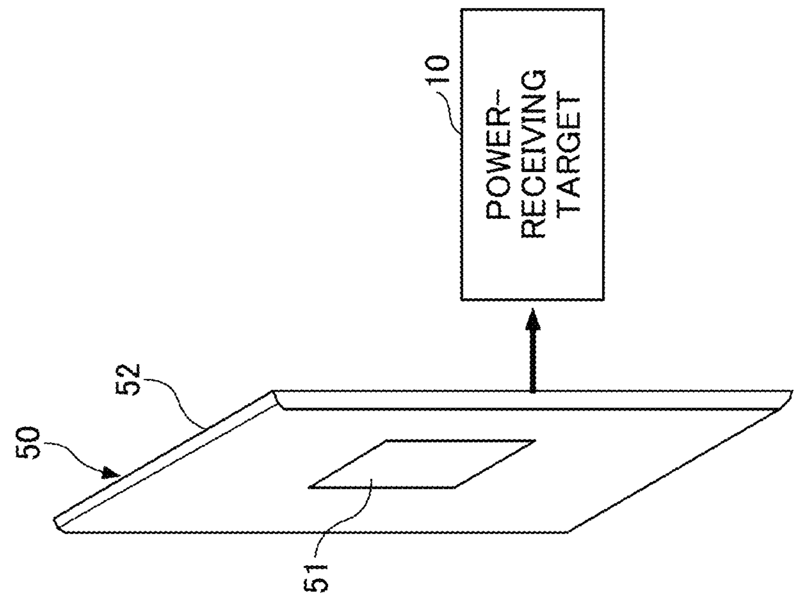
FIG.2
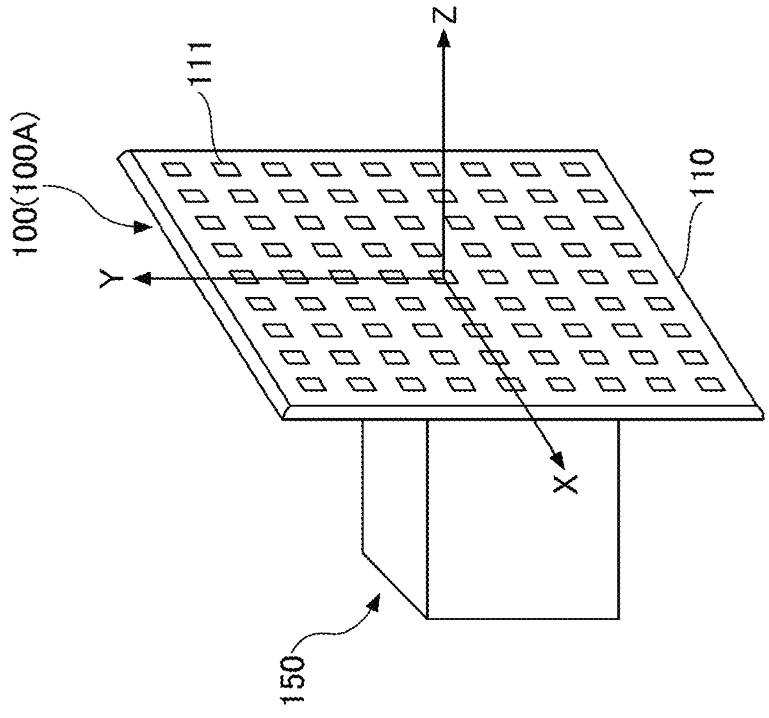

1
P3R(xR, yC)
P3C(xC, yC)
x
P3T(xC, yT)
ϕC
P3B(xC, yB)
rC
rT
ϕB
rB
y
ϕT
X
P3L(xL, yC)
ϕB
ϕT
110
ϕC
Y
O
115
111
52R
52
52T
θT
θC
θH
θB
52B
C(TX, TY, TZ)
52L
Z

ANTENNA DEVICE, POWER FEEDING APPARATUS, AND POWER FEEDING METHOD

TECHNICAL FIELD

The present disclosure relates to an antenna device, a power feeding apparatus, and a power feeding method.

BACKGROUND

Conventionally, there exists a power feeding apparatus having first detecting means for detecting a direction of a power receiving device; and control means for controlling a radiation unit that radiates feeding power such that the radiation unit performs a first radiation of radiating the feeding power wirelessly in a direction of the power receiving device detected by the first detecting means, and such that the radiation unit performs a second radiation of radiating the feeding power wirelessly while changing a direction of radiating the feeding power within a predetermined range. The radiation unit is an array antenna (see, for example, Patent Document 1).

RELATED-ART DOCUMENTS

Patent Documents

Patent Document 1: Japanese Unexamined Patent Application Publication No. 2019-083648.

SUMMARY

Problem to be Solved by the Invention

Here, in order to adjust phases of power transmission signals transmitted from a plurality of antenna elements included in an array antenna according to a position of a power receiving antenna of the power receiving device to increase received power at the power receiving antenna, an enormous amount of calculation is required. However, a conventional power feeding apparatus (power supply apparatus) has not solved such a problem.

Therefore, an object is to provide an antenna device, a power feeding apparatus, and a power feeding method capable of easily calculating phase adjustment amounts of power transmission signals at a plurality of antenna elements in an array antenna according to a position of a power receiving antenna in order to increase received power.

Means for Solving the Problem

An antenna device according to an embodiment of the present disclosure includes an array antenna including a plurality of antenna elements arranged two-dimensionally along a first axis and a second axis, the array antenna being configured to transmit a power transmission signal to a power receiving antenna that is configured to be disposed at a center of a marker, which is disposed facing the array antenna and has a same size as the array antenna in plan view; phase adjustment units configured to adjust phases of power transmission signals that are supplied to the plurality of antenna elements in a first axis direction and a second axis direction; an image acquisition unit configured to acquire an image of the marker through a fisheye lens disposed facing the marker; a first elevation-angle acquisition unit configured to acquire a first elevation angle of a marker center of the marker with respect to a third axis, and a projected elevation angle obtained by projecting the first elevation angle onto a plane including the first axis and the third axis, based on an marker image center that is the center of the marker in a marker image, and a focal distance of the fisheye lens; a second elevation-angle acquisition unit configured to determine second elevation angles of first endpoints and second endpoints with respect to the third axis, based on coordinates of the first endpoints of the marker in the marker image, coordinates of the second endpoints of the marker in the marker image, and the focal distance of the fisheye lens; a coordinate acquisition unit configured to determine a coordinate of the marker along the third axis based on the projected elevation angle, the marker image center that is the center of the marker in the marker image; either of projection coordinates of the second endpoints, and a length of the marker in a direction connecting the second endpoints; a first distance estimation unit configured to determine a first distance between the marker center and the fisheye lens, based on the first elevation angle and the coordinate of the marker along the third axis; a second distance estimation unit configured to determine second distances between the fisheye lens, and the first endpoints and the second endpoints; and a control unit configured to control phase adjustment amounts by which the phase adjustment unit adjusts the phases of the power transmission signals in the first axis direction and the second axis direction. The control unit is configured to set phase adjustment amounts for three antenna elements including antenna elements at both ends in the first axis direction and for three antenna elements including antenna elements at both ends in the second axis direction, based on path differences between the first distance and the second distances, and set the phase adjustment amounts for the plurality of antenna elements arranged two-dimensionally by parabolic interpolation of a quadratic function.

Effects of the Invention

An antenna device, a power feeding apparatus, and a power feeding method capable of easily calculating phase adjustment amounts of power transmission signals at a plurality of antenna elements in an array antenna according to a position of a power receiving antenna in order to increase received power can be provided.

BRIEF DESCRIPTION OF THE DRAWINGS

FIG. 1 is a diagram showing an example of the use of a power feeding apparatus 100 according to an embodiment.

FIG. 2 is a diagram showing an example of the power feeding apparatus 100 and a power receiving device 50 according to the embodiment.

MODE FOR CARRYING OUT THE INVENTION

Figure 3:
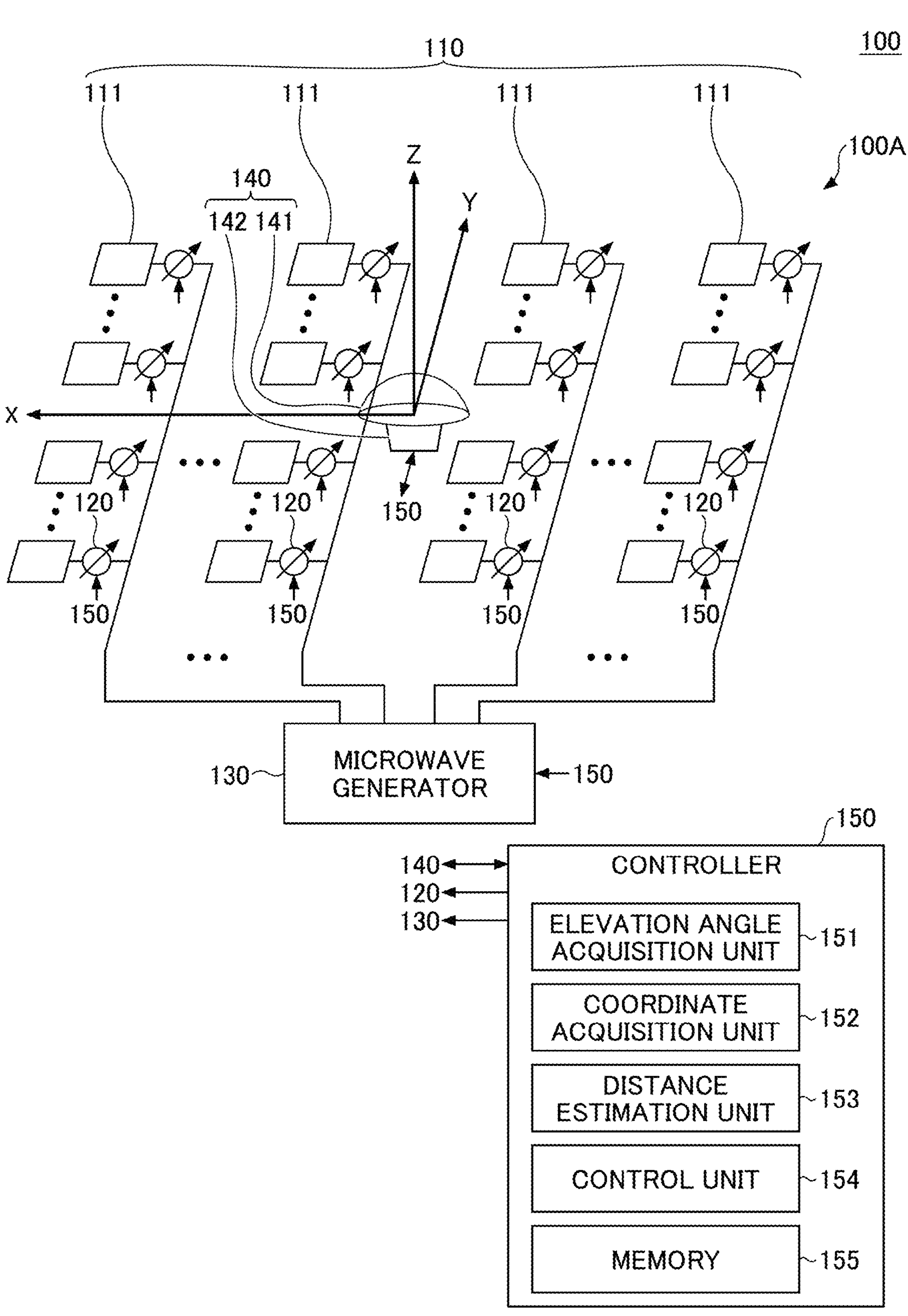
FIG. 3 is a diagram showing a configuration example of the power feeding apparatus 100 according to the embodiment.

Hereinafter, one or more embodiments to which an antenna device, a power feeding apparatus, and a power feeding method of the present disclosure are applied will be described.

Embodiments

Figure 1:
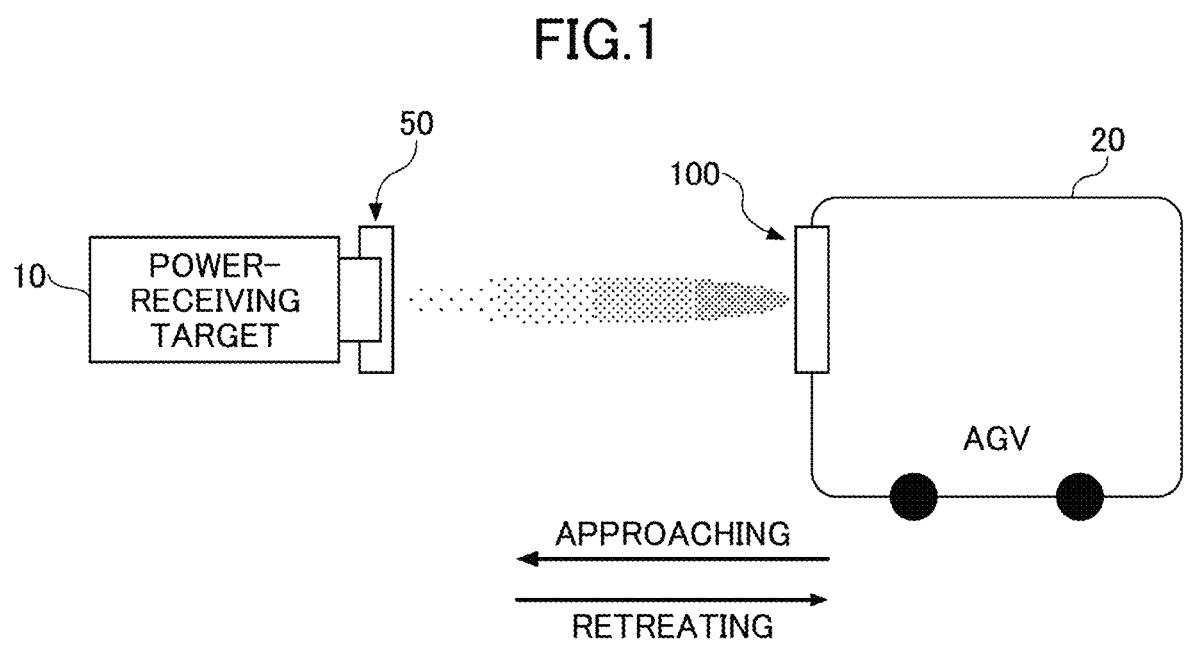

FIG. 1 is a diagram showing an example of the use of a power feeding apparatus 100 according to the embodiment. The power feeding apparatus 100 has an array antenna, and is, for example, mounted on an AGV (Automatic Guided Vehicle) 20 and movable. The power feeding apparatus 100 moves to a position facing a power receiving device 50 attached to a power-receiving target 10, and transmits a power transmission signal to the power receiving device 50. Positions of the power receiving device 50 and the power-receiving target 10 are fixed.

Even when the center of the array antenna deviates from the center of a power receiving antenna of the power receiving device 50 in any one of the directions, up, down, left, and right, the power feeding apparatus 100 can efficiently transmit power by adjusting phases of radio waves radiated from respective antenna elements of the array antenna.

Further, when the power feeding apparatus 100 transmits the power transmission signal not only while an AGV 20 is stopped with respect to the power receiving device 50, but also when the AGV 20 is approaching or retreating, efficient power transmission can be achieved, particularly in a case where there are a plurality of power receiving devices 50 and a plurality of power-receiving targets 10. In this case, if phases of radio waves radiated from the antenna elements of the array antenna in the power feeding apparatus 100 are adjusted such that power transmission efficiency becomes favorable according to a distance between the power feeding apparatus 100 and the power receiving device 50, more efficient power transmission can be achieved.

FIG. 2 is a diagram showing an example of the power feeding apparatus 100 and the power receiving device 50 according to the embodiment. FIG. 3 is a diagram showing a configuration example of the power feeding apparatus 100 according to the embodiment.

In the following, description will be provided using an XYZ coordinate system. A plane view means an XY plane view. An X-axis is an example of a first axis, a Y-axis is an example of a second axis, and a Z-axis is an example of a third axis.

Configuration of Power Feeding Apparatus 100 and Power Receiving Device 50

FIG. 2 shows the power receiving device 50 that is disposed facing the array antenna 110. The array antenna 110 has a plurality of antenna elements 111, and the plurality of antenna elements 111 are arranged in an array along the X-axis and the Y-axis. The array antenna 110 is an ultra-large-element phased array. As an example, the number of antenna elements 111 included in the array antenna 110 as the ultra-large-element phased array is about 200 to 1000.

A distance (facing distance) between the array antenna 110 and the power receiving device 50 in a Z direction is about 1 m to 2 m as an example. The power feeding apparatus 100 transmits one or more power transmission signals from the array antenna 110 to the power receiving device 50 by microwave wireless power feeding. The power transmission of the power transmission signals from the array antenna 110 to the power receiving device 50 is synonymous with power feeding from the array antenna 110 to the power receiving device 50.

The power receiving device 50 has a power receiving antenna 51 and a position marker 52. FIG. 2 shows the arrangement of the plurality of antenna elements 111, and the power receiving antenna 51 and the position marker 52 in an easy visible arrangement. However, the power receiving antenna 51 and the position marker 52 are actually arranged along the X-axis and the Y-axis, similar to the plurality of antenna elements 111. The size of the position marker 52 in plan view is the same as that of the array antenna 110 in plan view.

The array antenna 110 forms a beam from radio waves output from the plurality of antenna elements 111, and transmits a power transmission signal to the power receiving antenna 51 of the power receiving device 50, by scanning an angle of the beam serving as the power transmission signal.

The power receiving device 50 supplies power of the power transmission signal that is received by the power receiving antenna 51, from the array antenna 110 to the power-receiving target 10. The power-receiving target 10 may be any device or the like that consumes the power. As an example, one power-receiving target 10 is connected to one power receiving antenna 51.

Configuration of Power Feeding Apparatus 100

As shown in FIG. 3, the power feeding apparatus 100 includes the array antenna 110, phase shifters 120, a microwave generator 130, a camera 140, and a controller 150. An antenna device 100A according to the embodiment is the power feeding apparatus 100 from which the microwave generator 130 is removed. In FIG. 2, the phase shifters 120 and the microwave generator 130 are omitted.

Configuration of Array Antenna 110

The array antenna 110 includes, as an example, (2N+1)×(2N+1) antenna elements 111. N is an integer of two or more. The (2N+1)×(2N+1) antenna elements 111 are arranged (2N+1) in the X direction (first axis direction), and (2N+1) in the Y direction (second axis direction). That is, the (2N+1)×(2N+1) antenna elements 111 are arranged in (2N+1) rows×(2N+1) columns. This indicates from number −N(#−N) to number N(#N) in the X direction. The antenna element 111 is a rectangular patch antenna in plan view. The array antenna 110 may have a ground plate held at a ground potential on a −Z direction side of the antenna element 111. As an example, the center of positions of the (2N+1)×(2N+1) antenna elements 111 coincides with the origin of the XYZ coordinate system. The center of the positions of the (2N+1)×(2N+1) antenna elements 111 is an example of a reference position of the array antenna.

Configuration of Phase Shifters 120

The phase shifters 120 are connected one by one to each of the (2N+1)×(2N+1) antenna elements 111. The phase shifter 120 is an example of a phase adjustment unit that adjusts a phase, and is an example of a phase shifter. The power transmission signal having the same phase is supplied to each phase shifter 120. Also, phases of power transmission signals that are output from (2N+1)×(2N+1) phase shifters 120 to the (2N+1)×(2N+1) antenna elements 111 differ from one another. In this arrangement, the angle of the beam formed by the radio waves that are emitted from the (2N+1)×(2N+1) antenna elements 111 can be controlled in a horizontal direction and a vertical direction.

The beam that is formed by the radio waves emitted from the (2N+1)×(2N+1) antenna elements 111 is synonymous with a beam output from the array antenna 110. The beam output from the array antenna 110 is synonymous with a beam output from each of the antenna device 100A and the power feeding apparatus 100. The beam is the power transmission signal.

Configuration of Microwave Generator 130

The microwave generator 130 is connected to the (2N+1)×(2N+1) phase shifters 120, and supplies microwaves having a predetermined power level. The microwave generator 130 is an example of a radio wave generator. A microwave frequency is, for example, in a 24 GHz band of quasi-millimeter waves. In this description, although the power feeding apparatus 100 includes the microwave generator 130, it is not limited to microwaves, and radio any wave having a predetermined frequency may be used.

Configuration of Camera 140

The camera 140 is arranged at the position of a 0th antenna element 111 among-Nth to Nth antenna elements 111 in the X direction, and is arranged at the position of the 0th antenna element 111 among −Nth to Nth antenna 111 in the Y direction. The 0th antenna elements element 111 in the X direction is the same as the 0th antenna element 111 in the Y direction, and is positioned at the center of the (2N+1)×(2N+1) antenna elements 111. In the following description, it is assumed that the antenna element 111 positioned at the center of the (2N+1)×(2N+1) antenna elements 111 exists in order to determine a phase adjustment amount for each antenna element 111. However, a fisheye lens 141 of the camera 140 may be disposed without providing the antenna element 111 positioned at the center of the (2N+1)×(2N+1) antenna elements 111. Further, the position of the (2N+1)×(2N+1) antenna elements 111 or the fisheye lens 141 may be shifted to the extent that the position does not interfere with the calculation for acquiring the phase adjustment amount for each antenna element 111. In addition, the fisheye lens 141 may be arranged at a position offset from the array antenna 110, and as a result, the beam may be radiated at a position considering the positional deviation between the fisheye lens 141 and the array antenna 110 with respect to the position of the marker 52 as viewed from the fisheye lens 141.

The camera 140 has the fisheye lens 141 and a camera body 142. The camera 140 is an example of an image acquisition unit. The camera 140 is used to estimate the position of the position marker 52 by image processing. Estimating of the position of the position marker 52 by image processing is referred to as vision sensing.

The fisheye lens 141 is a lens adopting an equidistant projection system. As an example, the position of the center of the fisheye lens 141 coincides with the center of the (2N+1)×(2N+1) antenna elements 111, and the origin of the XYZ coordinate system. The position of the center of the fisheye lens 141 is an example of a reference position of an image acquisition unit. The camera body 142 is a part of the camera 140 other than the fisheye lens 141, and may be a camera including a CMOS Metal Oxide (Complementary Semiconductor) image sensor or an infrared camera.

The camera 140 acquires an image including the position marker 52 through the fisheye lens 141, and outputs image data to the controller 150. The position marker 52 is attached to the power receiving device 50 that has a power receiving antenna 50B that is a target toward which the beam outputted from the antenna device 100A and the power feeding apparatus 100 is to be radiated. The antenna device 100A and the power feeding apparatus 100 determine the position of the position marker 52 that is included in an image acquired by the camera 140, and then radiate the beam toward the power receiving antenna 50B.

The camera body 142 includes an imaging element, and acquires image data by capturing the image through the fisheye lens 141. The camera body 142 performs image processing such as binarization processing on the acquired image data, and outputs a pixel index to the controller 150. The pixel index is an XY coordinate value (address) indicating the position of the position marker 52 that is on an imaging screen.

The camera body 142 also performs both a process of determining the contour of the position marker 52 and a process of determining a maximum contour, and outputs data representing coordinates of the position marker 52, to the controller 150.

The process of determining the contour of the position marker 52 is a process of extracting one or more contours based on the distribution of pixel indexes obtained by performing binarization on the image data that is obtained using the camera body 142.

The process of determining the maximum contour is a process of determining the largest contour from one or more contours that are extracted based on the distribution of the pixel indexes (maximum contour extraction by counting the number of pixels in the contour). By determining the largest contour, effects of noise and the like can be eliminated.

A process of reading the coordinates of the position marker 52 is a process of reading the coordinates of the position marker 52 from the largest contour that is obtained by a process of finding the largest contour. The camera body 142 outputs the read coordinates of the position marker 52 to the controller 150.

Configuration of Controller 150

The controller 150 is implemented by a computer including a CPU (Central Processing Unit), a RAM (Random Access Memory), a ROM (Read Only Memory), an HDD (Hard Disk Drive), an input/output interface, an internal bus, and the like.

The controller 150 determines phase adjustment amounts to be set for all the phase shifters 120, by using parabolic interpolation of a quadratic function, and sets the determined phase adjustment amounts for the respective phase shifters 120. The controller 150 has a memory 155, and stores the determined phase adjustment amounts. The controller 150 also stores one or more normalized path difference lengths that are generated during a process of determining the phase adjustment amounts, in the memory 155. The normalized path difference length corresponds to a physical quantity corresponding to the phase adjustment amount, and details will be described later.

The controller 150 includes an elevation angle acquisition unit 151, a coordinate acquisition unit 152, a distance estimation unit 153, a control unit 154, and the memory 155. The elevation angle acquisition unit 151, the coordinate acquisition unit 152, the distance estimation unit 153, and the control unit 154 represent functions (functions) of one or more programs executed by the controller 150, as functional blocks. The memory 155 functionally represents a memory of the controller 150. The elevation angle acquisition unit 151 is an example of a first elevation-angle acquisition unit and a second elevation angle acquisition unit. The distance estimation unit 153 is an example of a first distance estimation unit and a second distance estimation unit.

The details of the processes of the elevation angle acquisition unit 151, the coordinate acquisition unit 152, the distance estimation unit 153, and the control unit 154 will be described later mainly with reference to FIG. 8.

Comparison of Power Transmission Signal Phase Distribution (Description for Comparison)

Figure 4A:
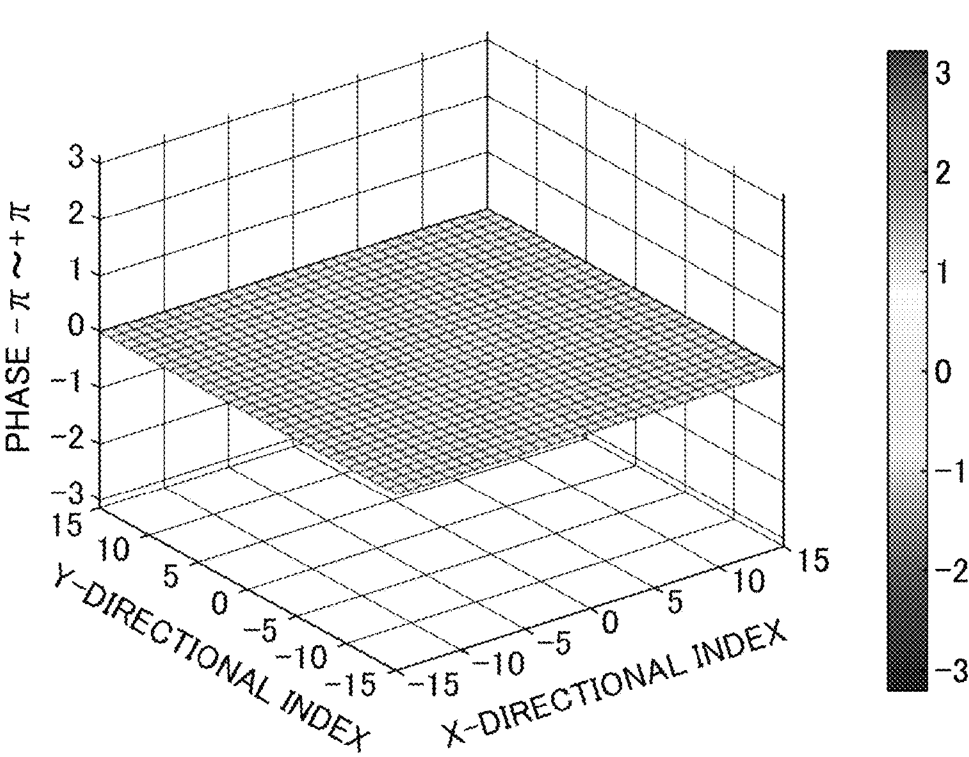
FIG. 4A is a diagram showing a two-dimensional phase distribution when radio waves are emitted in the same direction from antenna elements, assuming long-distance power transmission.
Figure 4B:
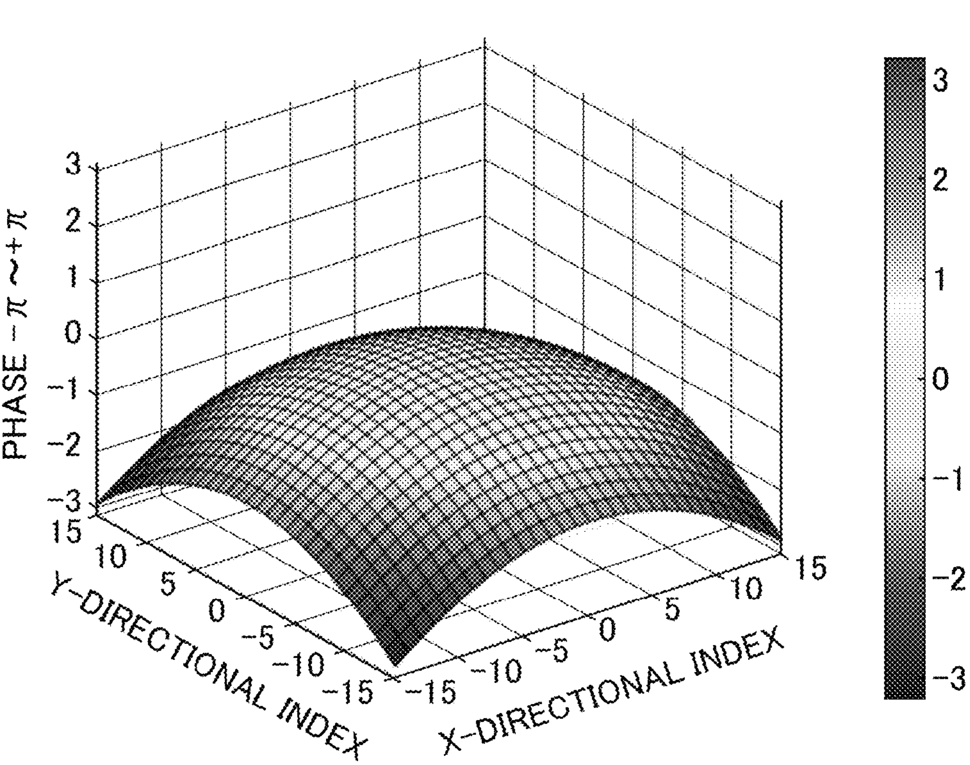
FIG. 4B is a diagram showing a two-dimensional phase distribution when radio waves are emitted in the same direction from the antenna elements, assuming short-distance power transmission.

FIGS. 4A and 4B are diagrams showing phase distributions when radiating radio waves from antenna elements toward the power receiving antenna in long-distance power transmission and short-distance power transmission. In this description, a difference in power transmission (communication) between the long-distance power transmission and the short-distance power transmission will be described when an array antenna for comparison having a plurality of antenna elements and a power receiving antenna for comparison face each other, as in the array antenna 110 and the power receiving antenna 51 having the plurality of antenna elements 111 as shown in FIG. 2. The description using FIGS. 4A and 4B and Equations (1) to (6) shown below are provided for the array antenna for comparison and the power receiving antenna for comparison, and these are not included in the embodiment.

FIG. 4A is a diagram showing a two-dimensional phase distribution when radiating radio waves in the same direction from respective antenna elements assuming long-distance power transmission. The long-distance power transmission refers to power transmission in a case where a distance to the power receiving antenna is sufficiently long compared to a wavelength and directions of the power receiving antenna as viewed from the respective antenna elements can be regarded as identical. The power receiving antenna is located at a front of each antenna element of the array antenna, and as a result, a phase difference between antenna elements is zero. In this arrangement, when radiating the radio waves in the same direction from the respective antenna elements assuming the long-distance power transmission, the phases become identical.

FIG. 4B shows the two-dimensional phase distribution in a case of radiating radio waves in the same direction from respective antenna elements assuming short-range power transmission. The short-range power transmission refers to power transmission in a case where a path difference between each antenna element and the power receiving antenna is so large that the path difference length does not significantly vary linearly with respect to an antenna element position, and it is necessary to adjust the phase of the power transmission signal that is transmitted from each antenna element. When the power receiving antenna faces a center position of the antenna array, a distance from peripheral antenna elements to the power receiving antenna becomes longer than that from the central antenna element, and it can be seen that the phase adjustment amounts vary.

In the short-range power transmission, as shown in FIG. 4B, by properly adjusting the phase of the radio wave output from each antenna element, phases of radio waves reaching from all antenna elements become equal at the position of the power receiving antenna, and thus received power at the power receiving antenna is maximized.

When the array antenna is an ultra-large-element phased array, it is necessary to transmit a test signal from each antenna element, measure a phase at a receiving antenna side, and return a phase measurement value to a power transmission side, in order to estimate a path difference between each antenna element and the power receiving antenna and to set the phase adjustment amounts for adjusting the phase of the radio wave for each antenna element. In such a situation, this direct approach requires the excessive computational complexity, and as a result, such an approach becomes difficult to implement. In addition, since the power transmission signal at each antenna element is weak, there may be a problem that measurement accuracy is not sufficient. Specifically, the phase adjustment amount for adjusting the phase of the radio wave at each antenna element is determined as follows. Here, when the ultra-large-element phased array has $(2N+1)\times(2N+1)$ array antennas in the X direction and Y direction, an index of each antenna element is defined as $(i_X, i_Y)$, and a coordinate point of each antenna in (X, Y, Z) coordinates is defined as $(di_X, di_Y, 0)$. The center coordinate of the array antenna is (0, 0, 0). The range of antenna element indexes (integers) is $-N \le i_X \le N$ and $-N \le i_Y \le N$, where N is an integer of one or more. When coordinates of the position of the power receiving antenna are defined as $(T_X, T_Y, T_Z)$, a distance from each antenna element to the power receiving antenna is expressed by the following Equation (1).

[Math. 1]

$$R_{i_X,i_Y} = \sqrt{(T_X - d_{i_X})^2 + (T_Y - d_{i_Y})^2 + T_Z^2} \tag{1}$$

When the distance from the center of the array antenna to the power receiving antenna is defined as a reference distance $R_{ref}$, the reference distance $R_{ref}$ is expressed by the following Equation (2).

[Math. 2]

$$R_{ref} = \sqrt{T_X^2 + T_Y^2 + T_Z^2} \quad (2)$$

A path difference length $\tau_{iX,iY}$ with respect to the reference distance $R_{ref}$ is expressed by the following Equation (3).

[Math. 3]

$$\tau_{i_X,i_Y} = R_{i_X,i_Y} - R_{ref} \quad (3)$$

A normalized path difference length $\eta_{iX,iY}$ that is obtained by normalizing the path difference length $\tau_{iX,iY}$ with a wavelength $\lambda$ is expressed by the following Equation (4).

[Math. 4]

$$\eta_{i_X,i_Y} = \frac{\tau_{i_X,i_Y}}{\lambda} \quad (4)$$

Phase displacement corresponding to the normalized path difference lengths $\eta_{iX,iY}$ (including rotation of $2\pi$ or more) is obtained between each antenna element and the power receiving antenna. In this arrangement, a phase adjustment amount is applied to the radio wave that is output by the antenna element so as to cancel the phase displacement. The phase adjustment amount in the antenna element is expressed in complex number notation by the following Equation (5).

[Math. 5]

$$w(i_X, i_Y) = \exp\left(-2\pi j \cdot \eta_{i_X,i_Y}\right) = w_I + jw_Q \quad (5)$$

A phase $\omega(i_X, i_Y)$ of the complex number is expressed by the following Equation (6).

[Math. 6]

$$\omega(i_X, i_Y) = \tan^{-1}\left(\frac{w_Q}{w_I}\right) \quad (6)$$

The range of the phase $\omega(i_X, i_Y)$ of the complex number is expressed by $[-\pi, \pi]$.

The determining of the phase $\omega(i_X, i_Y)$ of such a complex number for each antenna element of the array antenna as the ultra-large-element phased array requires enormous computational complexity, and as a result, it makes it difficult to implement.

In view of the above point, in the embodiment, an antenna device 100A, the power feeding apparatus 100, and a power supply method that can easily calculate phase adjustment amounts for power transmission signals at a plurality of antenna elements 111 of the array antenna 110 in accordance with a given position of the power receiving antenna, so as to increase received power increases. Details will be described below.

Figure 5:
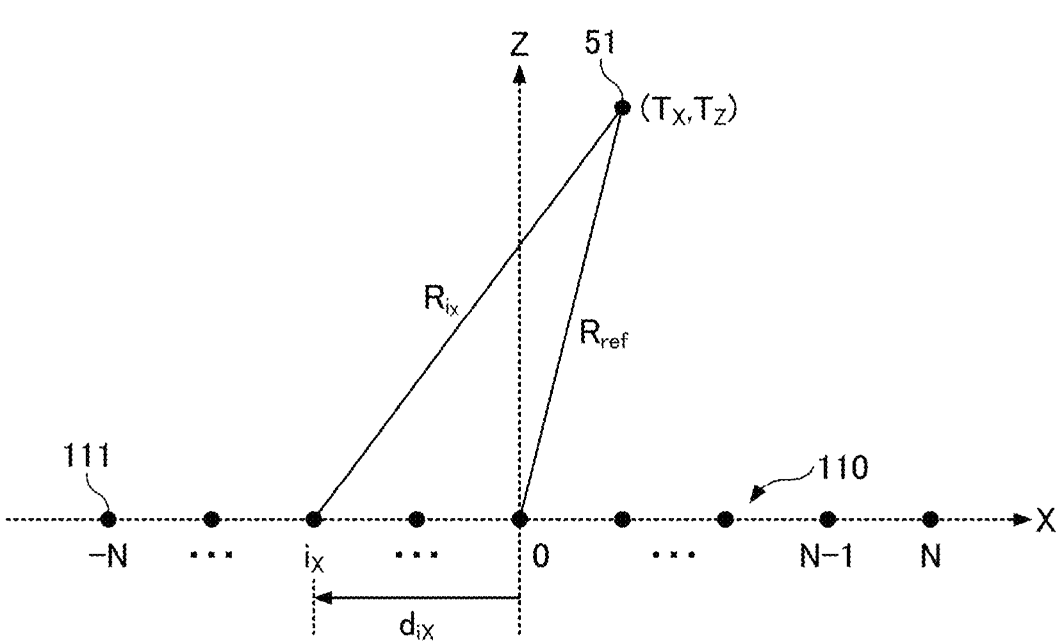
FIG. 5 is a diagram showing an example of a positional relationship in XZ coordinates between an array antenna 110, having (2N+1) antenna elements 111 arranged one-dimensionally along an X-axis, and a power receiving antenna 51.

To simplify the explanation, consider (2N+1) antenna elements arranged one-dimensionally along the X-axis. FIG. 5 is a diagram showing an example of the positional relationship between the array antenna 110 having the (2N+1) antenna elements 111 arranged one-dimensionally along the X-axis, and the power receiving antenna 51 in the XZ coordinates.

The index of the antenna elements 111 is defined as $i_X$, and the coordinates (X, Z) are defined as ($d_{iX}$, $d_{iZ}$). Here, $d_{iZ}=0$ is satisfied. A center coordinate of the array antenna 110 is (0, 0). The range of the index $i_X$ (integer) of the antenna elements 111 is $-N \le i_x \le N$. The (X, Z) coordinates of the power receiving antenna 51 are defined as ($T_X$, $T_Z$).

A distance $R_{iX}$ from each antenna element 111 to the power receiving antenna 51 is expressed by the following Equation (7).

[Math. 7]

$$R_{i_X} = \sqrt{\left(T_X - d_{i_X}\right)^2 + T_Z^2} \quad (7)$$

When a distance from the center of the array antenna 110 to the power receiving antenna 51 is defined as a reference distance $R_{ref}$, and the reference distance $R_{ref}$ is expressed by the following Equation (8).

[Math. 8]

$$R_{ref} = \sqrt{T_X^2 + T_Z^2} \quad (8)$$

A path difference length $\tau_{ix}$ with respect to the reference distance $R_{ref}$ is expressed by the following Equation (9).

[Math. 9]

$$\tau_{i_x} = R_{i_x} - R_{ref} \quad (9)$$

By transforming the distance $R_{ix}$ and the reference distance $R_{ref}$, respectively, the following Equations (10) and (11) are obtained.

[Math. 10]

$$R_{i_x} = \sqrt{\left(T_X - d_{i_x}\right)^2 + T_Z^2} = T_Z\sqrt{1 + \frac{\left(T_X - d_{i_x}\right)^2}{T_Z^2}} \quad (10)$$

[Math. 11]

$$R_{ref} = \sqrt{T_X^2 + T_Z^2} = T_Z\sqrt{1 + \frac{T_X^2}{T_Z^2}} \quad (11)$$

Here, when Equations (10) and (11) are respectively applied to a Taylor expansion formula expressed by Equation (12), the following Equations (13) and (14) are obtained.

[Math. 12]

$$\sqrt{1+X} = 1 + \frac{1}{2}X - \frac{1}{8}X^2 + \frac{1}{16}X^3 - \ldots \quad (12)$$

-continued

[Math. 13]

$$R_{i_X} = T_Z\left\{1 + \frac{1}{2}\frac{(T_X - d_{i_x})^2}{T_Z^2} - \frac{1}{8}\frac{(T_X - d_{i_x})^4}{T_Z^4} + \frac{1}{16}\frac{(T_X - d_{i_x})^6}{T_Z^6} - \dots\right\} \quad (13)$$

[Math. 14]

$$R_{ref} = T_Z\left\{1 + \frac{1}{2}\frac{T_X^2}{T_Z^2} - \frac{1}{8}\frac{T_X^4}{T_Z^4} + \frac{1}{16}\frac{T_X^6}{T_Z^6} - \dots\right\} \quad (14)$$

In Equations (13) and (14), considering up to the second term, the path difference length $\tau_{ix}$ can be expressed by the following Equation (15).

[Math. 15]

$$\tau_{i_x} = R_{i_x} - R_{ref} \cong \frac{1}{2}\frac{(T_X - d_{i_x})^2}{T_Z} - \frac{1}{2}\frac{T_X^2}{T_Z} = \frac{1}{2T_Z}\left(-2T_X d_{i_x} + d_{i_x}^2\right) \quad (15)$$

As described above, the path difference length $\tau_{ix}$ can be expressed by a quadratic function for the (2N+1) antenna elements 111 arranged one-dimensionally along the X-axis. In this arrangement, for the index $i_x$ of the antenna element 111, the normalized path difference length $\theta_{ix}$, which is obtained by normalizing the path difference length $\tau_{ix}$ by the wavelength, can be also expressed as a quadratic function. The index $i_X$ of the central antenna element 111, among the (2N+1) antenna elements 111 arranged one-dimensionally along the X-axis, is zero. Since a distance from the central antenna element 111 among the (2N+1) antenna elements 111 arranged one-dimensionally along the X-axis, to the power receiving antenna 51, is the reference distance $R_{ref}$, a normalized path difference length θ(0) for the antenna element 111 whose index $i_X$ is zero is zero. A phase corresponding to the normalized path difference length θ(0) for the antenna element 111 whose index $i_X$ is zero is an example of a first reference phase.

Figure 6:
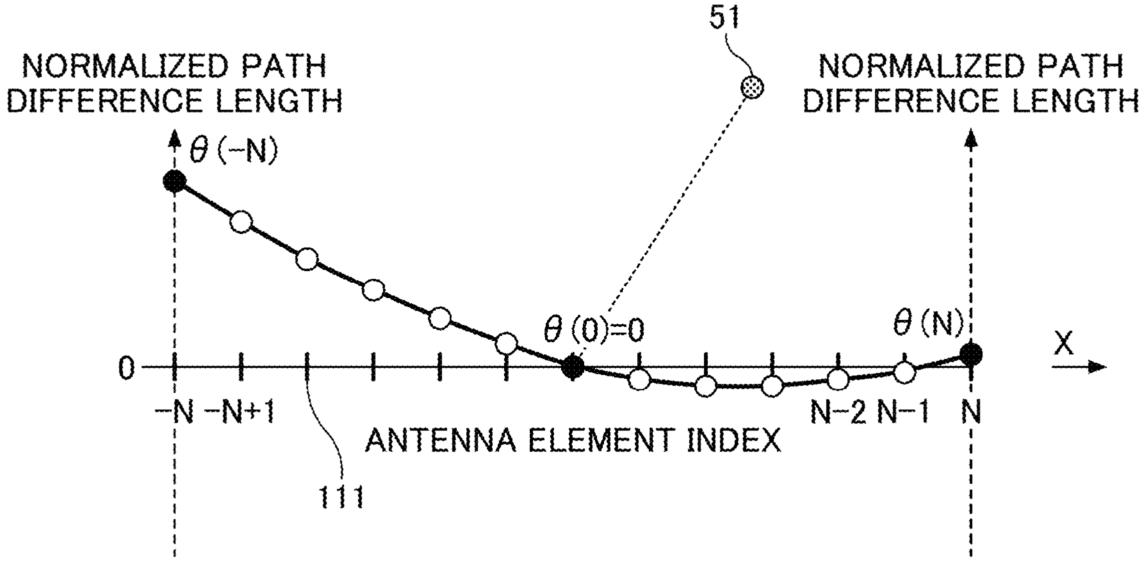
FIG. 6 is a diagram for describing an example of how to set a normalized path difference $\theta_{iX}$ for the (2N+1) antenna elements 111 arranged one-dimensionally along the X-axis.

FIG. 6 is a diagram for describing an example of how to set the normalized path difference length $\theta_{iX}$ for (2N+1) antenna elements 111 arranged one-dimensionally along the X-axis. As shown in FIG. 6, the normalized path difference length $\theta_{iX}$ for the (2N+1) antenna elements 111 arranged one-dimensionally along the X-axis can be set by parabolic interpolation of a quadratic function, using three points, namely, the antenna elements 111 at respective ends with indexes $i_X$ of −N and N, and the central antenna element 111 with an index $i_X$ of 0. Respective indexes $i_X$ for three antenna elements 111 are defined as ($i_s$, $i_m$, $i_e$), and a normalized path difference length $\theta_{X(i)}$ with respect to the remaining antenna elements 111 is estimated from normalized path difference lengths ($\theta_{is}$, $\theta_{im}$, $\theta_{ie}$) for the respective antenna elements by parabolic interpolation of the quadratic function, as shown in the following Equation (16).

[Math. 16]

$$\theta_X(i) = c_s(i)\theta_{i_s} + c_m(i)\theta_{i_m} + c_e(i) \quad (16)$$

Here, coefficients $c_s(i)$, $c_m(i)$, and $c_e(i)$ are given by the following Equation (17).

[Math. 17]

$$c_s(i) = \frac{(i - i_m)(i - i_e)}{(i_s - i_m)(i_s - i_e)} \quad (17)$$

$$c_m(i) = \frac{(i - i_e)(i - i_s)}{(i_m - i_e)(i_m - i_s)}$$

$$c_e(i) = \frac{(i - i_s)(i - i_m)}{(i_e - i_s)(i_e - i_m)}$$

Specifically, $i^s$=−N, $i_m$=0, and $i_e$=N are set. For the antenna element 111 with $i_m$=0 that is located at the reference distance, the normalized path difference θ(0) is constantly zero. In this arrangement, an appropriate normalized path difference is determined and set for two antenna elements 111 at respective ends, through vision sensing.

Taking into account the symmetry of the array antenna 110 in the X direction and the Y direction, the approach described in Equations (7) to (17) above is similarly applied to the (2N+1) antenna elements 111 arranged one-dimensionally along the Y-axis.

Then, a normalized path difference θ($i_X$, $i_Y$) for a two-dimensional array antenna 110, which is obtained by summing normalized path difference lengths in the X direction and the Y direction, is set as the following Equation (18).

[Math. 18]

$$\theta(i_X, i_Y) = \theta_X(i_X) + \theta_Y(i_Y) \quad (18)$$

Further, the normalized path difference θ($i_X$, $i_Y$) is converted to the phase adjustment amount $w_{iX,iY}$ by the following Equation (19), and the phase of the radio wave is adjusted by the phase adjustment amount $w_{iX,iY}$, through the phase shifter 120 that is connected to each of the (2N+1)×(2N+1) antenna elements 111 arranged in two dimensions, to thereby transmit the power transmission signal.

[Math. 19]

$$w_{i_X,i_Y} = \exp\{-2\pi j \cdot \theta(i_X, i_Y)\} \quad (19)$$

Figure 7A:
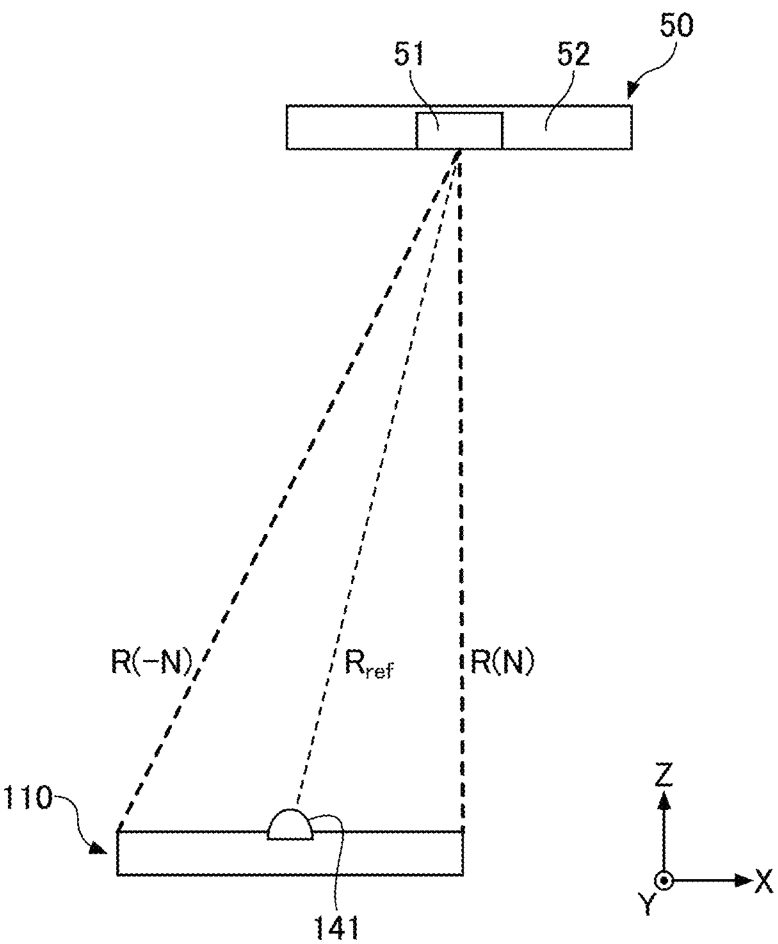
FIG. 7A is a diagram showing an example of a positional relationship between the array antenna 110 and a power receiving device 50.
Figure 7B:
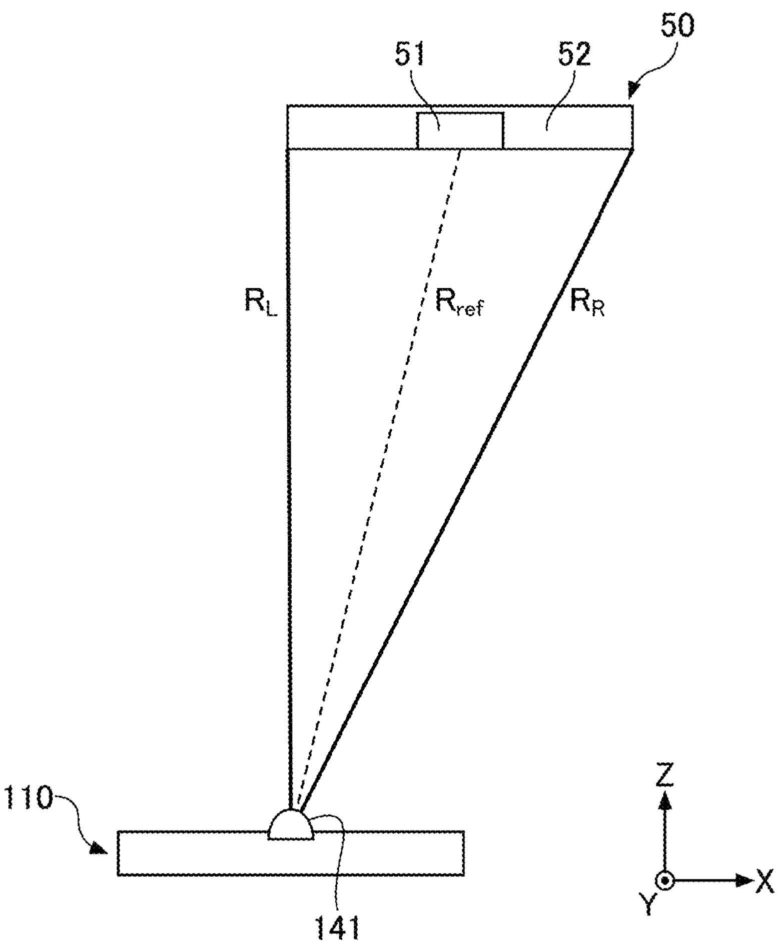
FIG. 7B is a diagram showing an example of the positional relationship between the array antenna 110 and the power receiving device 50.

FIGS. 7A and 7B are diagrams showing an example of the positional relationship between the array antenna 110 and the power receiving device 50. In each of FIGS. 7A and 7B, the position of the array antenna 110 is shifted relative to the power receiving device 50 in the X direction. The positional relationship between the array antenna 110 and the power receiving device 50 shown in FIGS. 7A and 7B is the same. In this example, the description will be provided using a lateral positional relationship in FIGS. 7A and 7B. Also, the description will be provided using a vertical positional relationship. An upward direction refers to the +Y direction, and a downward direction refers to the −Y direction.

The positional relationship between a left end, right end, upper end, and lower end of the array antenna 110 and a left end, right end, upper end, and lower end of the position marker 52 will be described below. In the following, a left endpoint, right endpoint, upper endpoint, and lower endpoint of the array antenna 110, and a left endpoint, a right endpoint, an upper endpoint, and a lower endpoint of the marker 52 are used. The Y coordinate of each of the left endpoint and right endpoint of the array antenna 110 is equal to the Y coordinate of the center of the array antenna 110. The X coordinate of the upper end and lower end of the array antenna 110 is equal to the X coordinate of the center of the array antenna 110. Similarly, the Y coordinate of each of the left endpoint and right endpoint of the position marker 52 is equal to the Y coordinate of the center of the position marker 52. The X coordinate of each of the upper end and lower end of the position marker 52 is equal to the X coordinate of the center of the position marker 52.

A distance R(−N) from the left endpoint of the array antenna 110 to the power receiving antenna 51 that is located at the center of the position marker 52 as a target, and a distance $R_R$ from the fisheye lens 141 to the right endpoint of the position marker 52 are equal. A distance R(N) from the right endpoint of the array antenna 110 to the power receiving antenna 51 located at the center of the position marker 52 as the target, and a distance Ri from the fisheye lens 141 to the left endpoint of the position marker 52 are equal.

Distances that can be directly calculated (estimated) using the camera 140 include the distance $R_R$ from the fisheye lens 141 to the right endpoint of the position marker 52; and the distance $R_L$ from the fisheye lens 141 to the left endpoint of the position marker 52. By use of the relationship described above, it is possible to estimate both the distance R(−N) from the left endpoint the array antenna 110 to the power receiving antenna 51 located at the center of the position marker 52 as the target, and the distance R(N) from the right endpoint of the array antenna 110 to the power receiving antenna 51 located at the center of the position marker 52 as the target.

Similarly, a distance from the upper endpoint of the array antenna 110 to the power receiving antenna 51 located at the center of the position marker 52, and a distance from the fisheye lens 141 to the lower endpoint of the position marker 52 are equal. A distance from the lower endpoint of the array antenna 110 to the power receiving antenna 51 located at the center of the position marker 52 as the target, and a distance from the fisheye lens 141 to the upper endpoint of the position marker 52 are equal.

Distances that can be directly calculated (estimated) using the camera 140 include the distance from the fisheye lens 141 to the lower endpoint of the position marker 52, and the distance from the fisheye lens 141 to the upper endpoint of the position marker 52. By use of the relationship described above, it is possible to estimate both the distance from the upper endpoint of the array antenna 110 to the power receiving antenna 51 located at the center of the position marker 52 as the target, and the distance from the lower endpoint of the array antenna 110 to the power receiving antenna 51 located at the center of the position marker 52 as the target.

The array antenna 110 and the position marker 52 have the same size in plan view, and even if the positions of the array antenna 110 and the position marker 52 are shifted in any direction of the X direction, the Y direction, and the Z direction, the relationship that the above-mentioned distances are equal is maintained.

Figure 8:
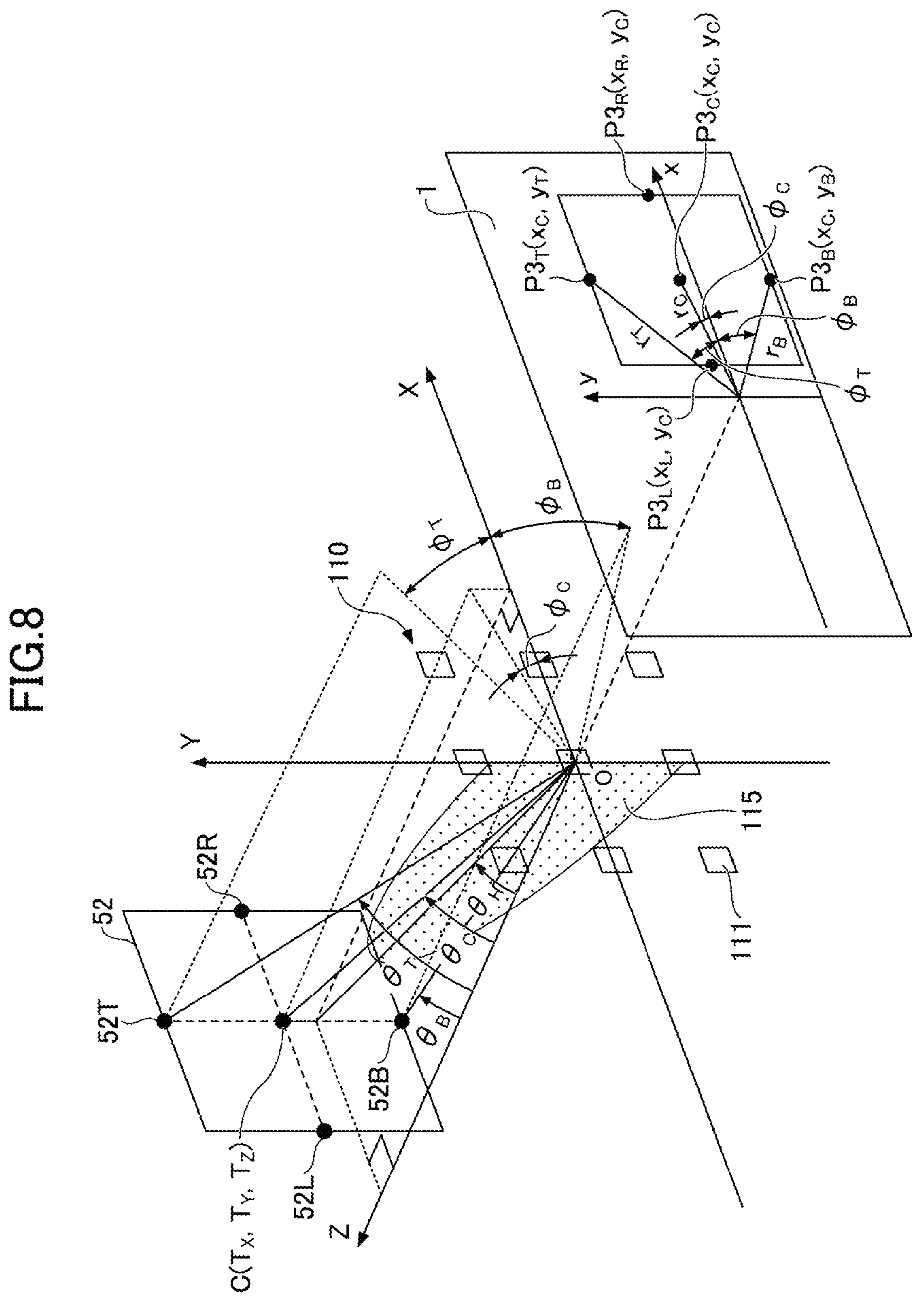
FIG. 8 is a diagram showing a polar coordinate system of the array antenna 110.

FIG. 8 is a diagram showing a polar coordinate system for the array antenna 110. FIG. 8 shows antenna elements 111 included in the array antenna 110 and a beam 115 output from the array antenna 110. In FIG. 8, the position marker 52 is shown in addition to the above components, and other components are omitted. FIG. 8 also shows the polar coordinate system on a plane 1 parallel to the XY plane. The plane 1 is the xy plane of image data acquired using the camera body 142, and corresponds to the xy plane that is used for pixel indexes output from the camera body 142. The x and y axes are parallel to X and Y axes related with the XYZ coordinates, respectively, and these axes have the same orientation.

The coordinates of the center C of the position marker 52 are ($T_X$, $T_Y$, $T_Z$), and are equal to the coordinates of the center of the power receiving antenna 51. As an example, the coordinates ($T_X$, $T_Y$, $T_Z$) of the center C of the position marker 52 are shifted in the +X direction and the +Y direction from the Z-axis. FIG. 8 shows a left endpoint 52L, a right endpoint 52R, an upper endpoint 52T, and a lower endpoint 52B of the position marker 52.

The polar coordinates of the upper endpoint 52T are given by an elevation angle $\theta_T$ and an azimuth angle $\phi_T$, the polar coordinates of the lower endpoint 52B are an elevation angle $\theta_B$ and an azimuth angle $\phi_B$. The polar coordinates of a center C are given by an elevation angle $\theta_C$ and an azimuth angle $\phi_C$. In FIG. 8, the polar coordinates (which are given by elevation angles $\theta_L$ and $\theta_R$ and azimuth angles di and $\phi_R$) of each of the left endpoint 52L and the right endpoint 52R are omitted.

Points obtained by projecting the left endpoint 52L, the right endpoint 52R, the upper endpoint 52T, the lower endpoint 52B, and the center C onto the plane 1 are respectively defined as $P3_L$, $P3_R$, $P3_T$, $P3_B$, and $P3_C$. The xy coordinates of the points $P3_L$, $P3_R$, $P3_T$, $P3_B$, and $P3_C$ on the plane 1 are ($x_L$, $y_C$), ($x_R$, $y_C$), ($x_C$, $y_T$), ($x_C$, $y_B$), and ($x_C$, $y_C$), respectively. The radial distances of the points $P3_L$, $P3_R$, $P3_T$, $P3_B$, and $P3_C$ are $r_L$, $r_R$, $r_T$, $r_B$, and $r_C$, respectively.

The radius $r_C$ of the center C is expressed by $rC=f_L\theta_C$ using the focal length $f_L$ of the fisheye lens 141 and the elevation angle $\theta_C$ of the center C. Similarly, the radius $r_L$, $r_R$, $r_T$, and $r_B$ of the left endpoint 52L, the right endpoint 52R, the upper endpoint 52T, and the lower endpoint 52B are respectively expressed by $r_L=f_L\theta_L$, $r_R=f_L\theta_R$, $r_T=f_L\theta_T$, and $r_B=f_L\theta_B$.

The xy coordinates ($x_C$, $y_C$) of the center C are expressed by $x_C=r_C \cos \varphi_C$ and $y_C=r_C \sin \phi_C$ when the radius $r_C$ and the azimuth angle $\phi_C$ are used. Similarly, each of the xy coordinates of the left endpoint 52L, the right endpoint 52R, the upper endpoint 52T, and the lower endpoint 52B can also be expressed by the radius and azimuth angle.

The center coordinates of the position marker 52 in a three-dimensional space are defined to be equal to the center coordinates ($T_X$, $T_Y$, $T_Z$) of the position marker 52. When the center coordinates ($T_X$, $T_Y$, $T_Z$) of the position marker 52 in the three-dimensional space are converted to spherical coordinates (elevation angle $\theta_T$, azimuth angle $\phi_T$), these coordinates are expressed as the following Equation (20).

[Math. 20]

$$(\theta_T, \phi_T) = \left(\tan^{-1}\frac{\sqrt{T_X^2 + T_Y^2}}{T_Z}, \tan^{-1}\frac{T_Y}{T_X}\right) \quad (20)$$

The coordinates ($x_C$, $y_C$) that are obtained by projecting the center coordinates ($T_X$, $T_Y$, $T_Z$) of the position marker 52 onto the xy plane of the image data from the camera 140 through the fisheye lens 141 are expressed by the following Equation (21), using equidistant projection the focal distance $f_L$. The center coordinates ($T_X$, $T_Y$, $T_Z$) of the position marker 52 are centroid coordinates of the image of the position marker 52.

[Math. 21]

$$(x_C, y_C) = (f_L\theta_C \cos\phi_C, f_L\theta_C \sin\phi_C) \tag{21}$$

Since radius $r_C$ is expressed as the square root of the sum of squares of $x_C$ and $y_C$, the elevation angle $\theta_C$ representing projection coordinates ($x_C$, $y_C$) of the position marker 52 is expressed by the following Equation (22). That is, the elevation angle $\theta_C$ can be expressed using the focal distance $f_L$ and the projection coordinates by polar coordinate transformation.

[Math. 22]

$$\theta_C = \frac{1}{f_L}\sqrt{x_C^2 + y_C^2} \tag{22}$$

When $y_C=0$ is set in Equation (22), projected elevation angle (horizontal angle) $\theta_H$ of a line that is projected onto the XZ plane and that extends from the origin of the XYZ coordinates to the center coordinates ($T_X$, $T_Y$, $T_Z$) of the position marker 52 is expressed by the following Equation (23). With this approach, the projected elevation angle $\theta_H$ can be easily determined.

[Math. 23]

$$\theta_H = \frac{1}{f_L}x_C \tag{23}$$

Here, the Z coordinate $T_Z$ among the center coordinates ($T_X$, $T_Y$, $T_Z$) of the position marker 52 is estimated. When the length of the position marker 52 in the Y direction (height direction) is defined as $T_h$, the Y coordinate of the upper endpoint 52T of the position marker 52 is expressed by $T_Y+T_h/2$. In this arrangement, by using the azimuth angle or shown in Equation (20), the azimuth angle $\phi_T$ of the upper endpoint 52T of the position marker 52 can be expressed by the following Equation (24).

[Math. 24]

$$\tan\phi_T = \frac{T_Y + T_h/2}{T_X} \tag{24}$$

Similarly, since the Y coordinate of the lower endpoint 52B of the position marker 52 is expressed by $T_Y-T_h/2$, an azimuth angle $\phi_B$ of the lower endpoint 52B of the position marker 52 can be expressed by the following Equation (25) using the azimuth angle $\phi_C$ shown in Equation (20).

[Math. 25]

$$\tan\phi_B = \frac{T_Y - T_h/2}{T_X} \tag{25}$$

The length $T_h$ of the position marker 52 in the Y direction (height direction) is expressed by the following Equation (26) from Equations (24) and (25).

[Math. 26]

$$T_h = T_X(\tan\phi_T - \tan\phi_B) \tag{26}$$

By rearranging Equation (26), the X coordinate $T_X$ of the center of the position marker 52 is expressed by the following Equation (27).

[Math. 27]

$$T_X = \frac{T_h}{\tan\phi_T - \tan\phi_B} = \frac{T_h}{\frac{y_T}{x_C} - \frac{y_B}{x_C}} \tag{27}$$

In this arrangement, the Z coordinate $T_Z$ of the center of the position marker 52 is expressed by the following Equation (28). With this approach, the Z coordinate $T_Z$ of the center of the position marker 52 can be estimated based on the image, using Equation (28). The coordinate $T_Z$ of the center of the position marker 52 is calculated while avoiding zero for $x_C$ in Equation (28). A projected elevation angle $\theta_H$ can be calculated from Equation (23).

[Math. 28]

$$T_z = \frac{T_X}{\tan\theta_H} = \frac{T_h}{\tan\theta_H\left(\frac{y_T}{x_C} - \frac{y_B}{x_C}\right)} \tag{28}$$

The relationship in the following Equation (29) can be derived from Equation (20).

[Math. 29]

$$\sqrt{T_X^2 + T_Y^2} = T_Z \cdot \tan\theta_C \tag{29}$$

By squaring both sides of Equation (29) and adding $T_Z^2$ to both sides, the following Equation (30) is obtained.

[Math. 30]

$$T_X^2 + T_Y^2 + T_Z^2 = T_Z^2 \cdot \tan^2\theta_C + T_Z^2 \tag{30}$$

By taking the square root of both sides of Equation (30), a reference distance $R_{ref}$ is obtained, and is expressed by the following Equation (31).

[Math. 31]

$$R_{ref} = \sqrt{T_X^2 + T_Y^2 + T_Z^2} = T_Z\sqrt{1 + \tan^2\theta_C} = \frac{T_Z}{\cos\theta_C} \tag{31}$$

Similarly, the coordinates of the left endpoint 52L of the position marker 52 are expressed by ($T_X-T_w/2$, $T_Y$, $T_Z$). When the elevation angle $\theta_L$ of the left endpoint 52L of the position marker 52 is obtained from the coordinates ($x_L$, $y_C$) of a point P$3_L$ that corresponds to a left endpoint P$3_L$ of the position marker 52 on the xy plane of the image data from the camera 140, a length $R_L$, which is a path length for the left endpoint 52L of the position marker 52, is expressed by the following Equation (32).

[Math. 32]

$$R_L = \frac{T_Z}{\cos\theta_L} \quad (32)$$

A path length difference $\tau_L$ between the path length $R_L$ and the reference distance $R_{ref}$ is expressed by the following Equation (33).

[Math. 33]

$$\tau_L = R_L - R_{ref} = T_Z\left(\frac{1}{\cos\theta_L} - \frac{1}{\cos\theta_C}\right) \quad (33)$$

A normalized path difference $\eta_L$ obtained by dividing the path length difference $\tau_L$ by the wavelength $\lambda$ is expressed by the following Equation (34).

[Math. 34]

$$\eta_L = \frac{T_Z}{\lambda}\left(\frac{1}{\cos\theta_L} - \frac{1}{\cos\theta_C}\right) \quad (34)$$

Here, the elevation angle $\theta_C$ representing projection coordinates ($x_C$, $y_C$) of the position marker 52 can be determined from Equation (22). The elevation angle $\theta_L$ of the left endpoint 52L is expressed by the following Equation (35) through polar coordinate transformation from the coordinates ($x_R$, $y_C$) of the point P3L on the xy plane of the image data.

[Math. 35]

$$\theta_L = \frac{1}{f_L}\sqrt{x_L^2 + y_C^2} \quad (35)$$

Similarly, when elevation angles $\theta_R$, $\theta_T$, and $\theta_B$ of the right endpoint 52R, the upper endpoint 52T, and the lower endpoint 52B of the position marker 52 are respectively determined by polar coordinate transformation from coordinates ($x_R$, $y_C$), ($x_C$, $y_T$), and ($x_C$, $y_B$) of points P3$_R$, P3$_T$, and P3$_B$ on the xy plane of the image data that correspond to the right endpoint 52R, the upper endpoint 52T, and the lower endpoint 52B of the position marker 52 on the xy plane of the image data from the camera 140, normalized path difference lengths expressed by the following Equations (36) to (38) can be calculated.

[Math. 36]

$$\eta_R = \frac{T_Z}{\lambda}\left(\frac{1}{\cos\theta_R} - \frac{1}{\cos\theta_C}\right) \quad (36)$$

[Math. 37]

$$\eta_T = \frac{T_Z}{\lambda}\left(\frac{1}{\cos\theta_T} - \frac{1}{\cos\theta_C}\right) \quad (37)$$

[Math. 38]

$$\eta_B = \frac{T_Z}{\lambda}\left(\frac{1}{\cos\theta_B} - \frac{1}{\cos\theta_C}\right) \quad (38)$$

With this approach, by use of normalized path difference lengths $\eta_L$ and $\eta_R$ for the left endpoint 52L and the right endpoint 52R, and the normalized path difference ($\eta_0$=0) for the antenna element 111 located at the center in the X direction, it is sufficient to set two-dimensional phase adjustment amounts for phase shifters 120 connected to all antenna elements 111 in the left-right direction (X direction).

Further, by use of normalized path difference lengths nr and ns for the upper endpoint 52T and the lower endpoint 52B and the normalized path difference ($\eta_0$=0) for the antenna element 111 located at the center in the Y direction, it is sufficient to set two-dimensional phase adjustment amounts for phase shifters 120 connected to all antenna elements 111 in the up-down direction (Y direction).

More specifically, by use of the normalized path difference lengths $\eta_L$ and $\eta_R$ for the left endpoint 52L and the right endpoint 52R, and the normalized path difference ($\eta_0$=0) for the antenna element 111 located at the center in the X direction, normalized path difference lengths $\theta_{Y(i)}$ for all antenna elements 111 in the left-right direction (X direction) are obtained by parabolic interpolation of a quadratic function.

Similarly, by use of the normalized path difference lengths $\eta_T$ and $\eta_B$ of the upper endpoint 52T and the lower endpoint 52B; and the normalized path difference length ($\eta_0$=0) for the antenna element 111 located at the center in the Y direction, normalized path difference lengths $\theta_{Y(i)}$ for all antenna elements 111 in the up-down direction (Y direction) are obtained by parabolic interpolation of a quadratic function.

The processing described above using FIG. 8 is summarized as follows.

Summary of Processing by Elevation Angle Acquisition Unit 151

Based on the projection coordinates ($x_C$, $y_C$) that are obtained by projecting the center coordinates ($T_X$, $T_Y$, $T_Z$) of the position marker 52 and the focal length $f_L$ of the fisheye lens 141, the elevation angle acquisition unit 151 acquires a first elevation angle $\theta_C$ of a marker center of the position marker 52 with respect to the Z-axis, and acquires a projected elevation angle $\theta_H$ obtained by projecting the first elevation angle $\theta_C$ onto a plane including the X-axis and the Z-axis.

The elevation angle acquisition unit 151 acquires second elevation angles $\theta_T$, $\theta_B$, $\theta_L$ and $\theta_R$ of the first endpoints 52L and 52R and the second endpoints 52T and 52B with respect to the Z-axis, respectively, based on: projection coordinates of the first endpoints 52L and 52R in the X-axis direction of the position marker 52 in the image; projection coordinates of the second endpoints 52T and 52B in the Y-axis direction of the position marker 52 in the image; and the focal distance $f_L$ of the fisheye lens 141.

Summary of Processing by Coordinate Acquisition Unit 152

The coordinate acquisition unit 152 determines the coordinate $T_Z$ of the position marker 52 along the Z-axis, based on: the projected elevation angle $\theta_H$; the projection coordinates ($x_C$, $y_C$) obtained by projecting the center coordinates ($T_X$, $T_Y$, $T_Z$) of the position marker 52; projection coordinates of either the second endpoint 52T or 52B; and the length $T_h$ of the position marker 52 in a direction connecting the second endpoints 52T and 52B.

Summary of Processing by Distance Estimation Unit 153

The distance estimation unit 153 determines the first distance Rref between the center of the marker and the fisheye lens 141, based on the first elevation angle $\theta_C$ and the coordinate $T_Z$ of the position marker 52 along distance the Z-axis. The estimation unit 153 respectively determines second distances $R_T$, $R_B$, $R_L$, and $R_R$ from the fisheye lens 141 to the first endpoints 52L and 52R and the second endpoints 52T and 52B, based on second elevation angles $\theta_T$, $\theta_B$, $\theta_L$ and $\theta_R$ of the first endpoints 52L and 52R and the second endpoints 52T and 52B with respect to the Z-axis, and on the coordinate $T_Z$ of the position marker 52 along the Z-axis.

Summary of Processing by Control Unit 154

Based on path differences between the first distance Rref and the second distances $R_T$, $R_B$, $R_L$, and $R_R$, the control unit 154 sets phase adjustment amounts for three antenna elements 111 including antenna elements 111 at both ends in the X-axis direction and for three antenna elements 111 including antenna elements 111 at both ends in the Y-axis direction, and sets the phase adjustment amounts for a plurality of antenna elements 111 arranged two-dimensionally by parabolic interpolation of a quadratic function.

Further, the control unit 154 sets the phase adjustment amount for the antenna element 111 at the center of both ends in the X-axis direction to match a first reference phase, and sets phase adjustment amounts for the antenna elements 111 at both ends in the X-axis direction to phase adjustment amounts corresponding to path differences between second distances and the first distance for the first endpoints 52L and 52R. Further, the control unit 154 sets the phase adjustment amount for the antenna element 111 at the center of both ends in the Y-axis direction to match a second reference phase, and sets phase adjustment amounts for the antenna elements 111 at both ends in the Y-axis direction, to phase adjustment amounts corresponding to path differences between second distances and the first distance for the second endpoints 52T and 52R.

More specifically, the control unit 154 sets phase adjustment amounts for a plurality of antenna elements 111 by parabolic interpolation of a quadratic function in the X-axis direction, in a state of setting the phase adjustment amount for the antenna element 111 at the center of both ends in the X-axis direction to match the first reference phase and setting the phase adjustment amounts for the antenna elements 111 at both ends in the X-axis direction to the phase adjustment amounts corresponding to the path differences between the second distances and the first distance for the first endpoints 52L and 52R. Further, the control unit 154 sets the phase adjustment amount of the antenna element 111 at the center of both ends in the Y-axis direction to match the second reference phase, and sets phase adjustment amounts for a plurality of antenna elements 111 by parabolic interpolation of the quadratic function in the Y-axis direction, in a state of setting the phase adjustment amounts for antenna elements 111 at both ends in the Y-axis direction to the phase adjustment amounts corresponding to the path differences between the second distances and the first distance for the second endpoints 52T and 52B.

Example of Distribution of Normalized Path Difference Lengths

Figure 9A:
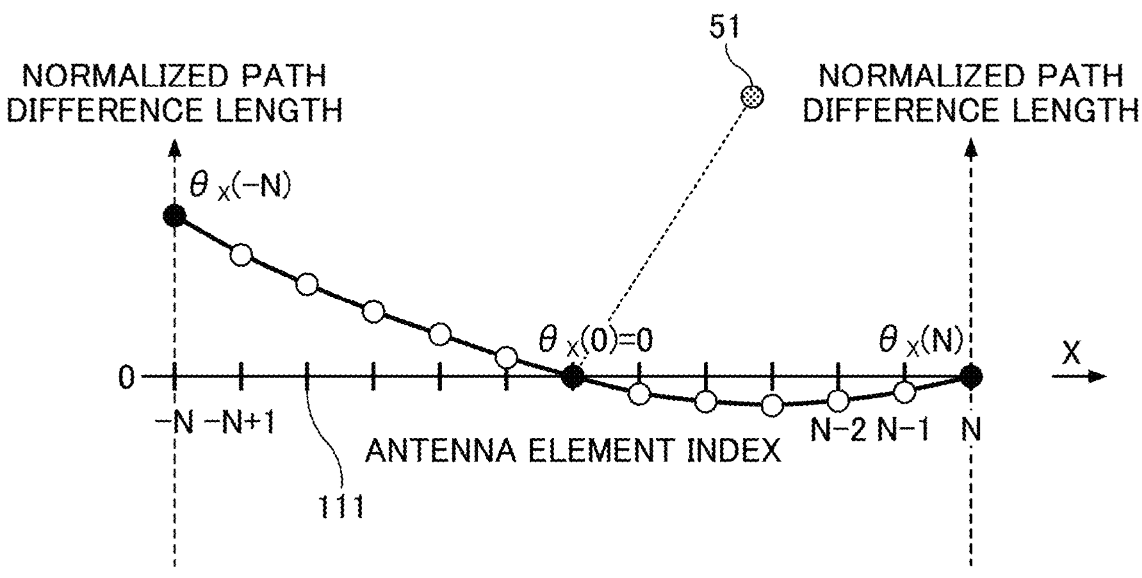
FIG. 9A is a diagram showing an example of the distribution of normalized path difference lengths calculated in an X direction and a Y direction.
Figure 9B:
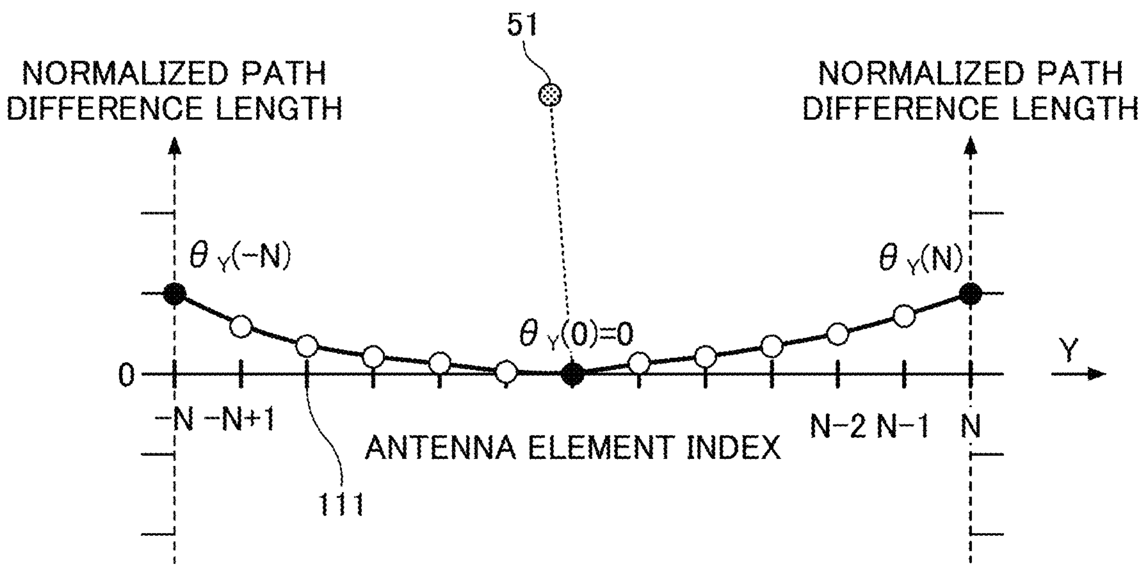
FIG. 9B is a diagram showing an example of the distribution of normalized path difference lengths calculated in the X direction and the Y direction.

FIGS. 9A and 9B are diagrams showing an example of the distribution of normalized path difference lengths calculated in the X-direction and the Y-direction.

FIG. 9A is the diagram showing the example of the distribution of normalized path difference lengths when normalized path difference lengths $\theta_X(-N)=(\eta_R)$ and $\theta_X(N)=(\eta_L)$ are set for the antenna elements 111 located at both ends in the X direction, and normalized path difference lengths for antenna elements 111 located from the (−N+1)th to the −1st position and from the 1st to the (1)th position in the X direction are calculated by performing parabolic interpolation of a quadratic function.

FIG. 9B is the diagram showing the example of the distribution of normalized path difference lengths when normalized path difference lengths $\theta_Y(-N)=(\eta_T)$ and $\theta_Y(N)=(\eta_B)$ are set for antenna elements 111 located at both ends in the Y direction, and normalized path difference lengths for antenna elements 111 located from the (−N+1)th to the −1st position and from the 1st to the (N−1)th position in the Y direction are calculated by performing parabolic interpolation of a quadratic function.

Then, the normalized path difference length $\theta(i_X, i_Y)$ for the two-dimensional array antenna 110, obtained by summing the normalized path difference lengths in the X direction and the Y direction, is set according to Equation (18). Further, the normalized path difference length $\theta(i_X, i_Y)$ is converted to the phase adjustment amount $w_{iX,iY}$ according to Equation (19), and as a result, it is sufficient to transmit the power transmission signal by adjusting the phase of the radio wave with the phase adjustment amount $w_{iX,iY}$, using the phase shifter 120 connected to each of the (2N+1)×(2N+1) elements antenna 111 arranged two-dimensionally.

In this arrangement, the beam 115 of the power transmission signal can be transmitted from the array antenna 110 in a state where received power at the power receiving antenna 51 increases according to the position of the position marker 52.

Simulation Result

Simulation results will be described with reference to FIGS. 10A and 10B. In each of these figures, the simulation is performed on a power feeding apparatus for comparison, as in the power feeding apparatus 100 according to the embodiment. The power feeding apparatus for comparison radiates a beam in a direction toward where the power receiving antenna 51 is positioned with respect to the center of the array antenna 110, without performing phase adjustment of radio waves at respective antenna elements 111 of the array antenna 110.

Figure 10A:
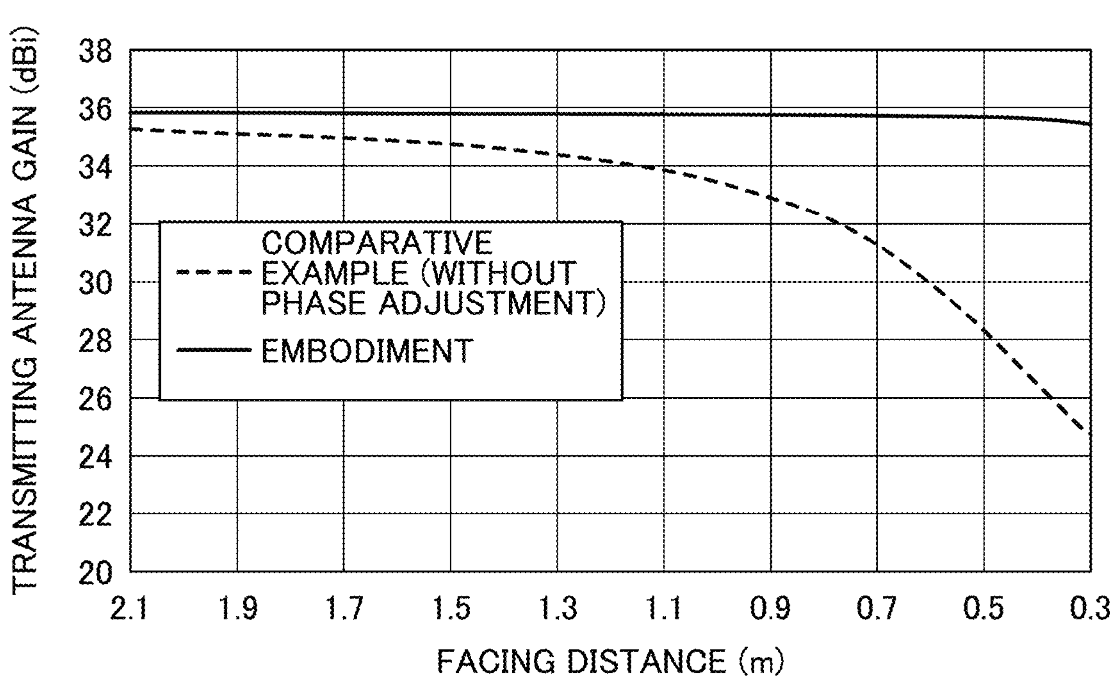
FIG. 10A is a diagram showing an example of simulation results of transmission antenna gain as viewed at a position of the power receiving antenna 51.

FIG. 10A shows an example of the simulation results for transmission antenna gain as observed at the position of the power receiving antenna 51. In FIG. 10A, the horizontal axis represents the facing distance (m), and the vertical axis represents the transmission antenna gain (dBi) as observed at the position of the power receiving antenna 51.

When the facing distance is 2 m or more, the difference in the transmission antenna gain between the power feeding apparatus 100 of the embodiment and the power feeding apparatus for comparison is less than 1 dB. However, when the facing distance is less than about 1 m, the transmission antenna gain for the power feeding apparatus for comparison rapidly decreases. On the other hand, the transmission antenna gain for the power feeding apparatus 100 of the embodiment hardly decreases and remains constant even when the facing distance is reduced to 0.3 m.

Figure 10B:
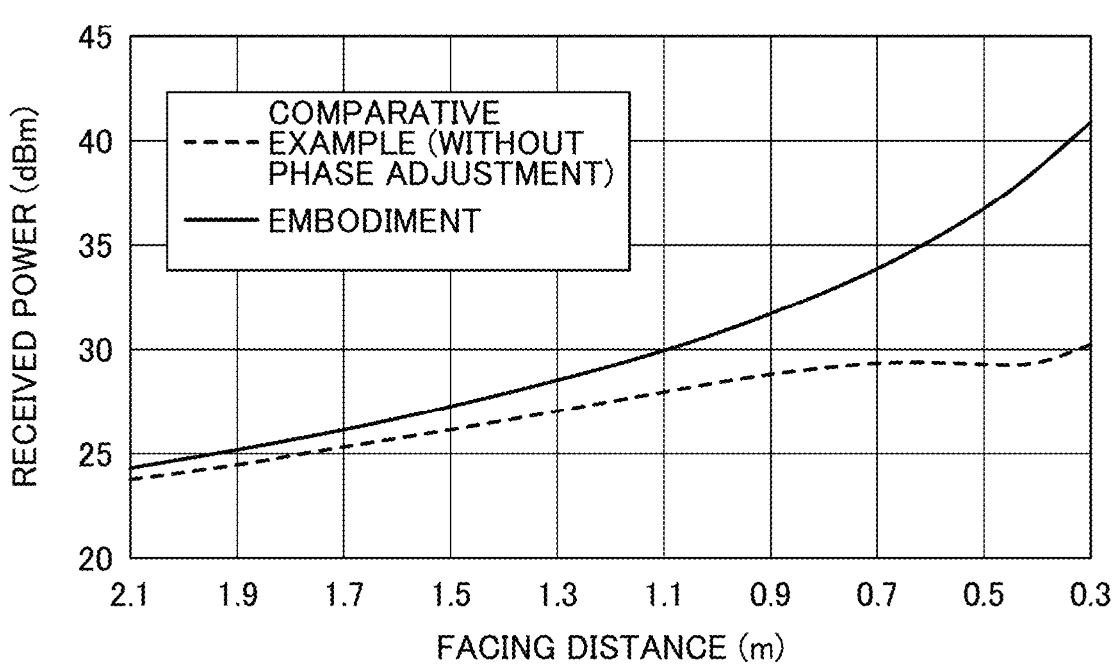
FIG. 10B is a diagram showing an example of the simulation results of received power at the power receiving antenna 51.

FIG. 10B is a diagram showing an example of the simulation results for received power of the power receiving antenna 51. In FIG. 10B, the horizontal axis represents the facing distance (m), and the vertical axis represents the received power (dBm) when the power receiving antenna 51 having the power receiving antenna gain of 15 dBi is used.

When the facing distance is 2 m or more, the difference in the received power between the power feeding apparatus 100 of the embodiment and the power feeding apparatus for comparison is less than 1 dB. However, when the facing distance is less than about 1 m, an increase rate of the received power of the feed device for comparison decreases. On the other hand, the received power of the power feeding apparatus 100 according to the embodiment tends to increase as the facing distance decreases, because distance attenuation in the received power is decreased.

As described above, by performing parabolic interpolation of the quadratic function based on normalized path difference lengths for both ends of the array antenna 110 in the X direction and the Y direction, the power feeding apparatus 100 of the embodiment can optimize phase adjustment amounts for radio waves at all antenna elements 111, and can maximize the received power of the power receiving antenna 51.

Effects

An antenna device 100A includes an array antenna 110, phase shifters 120, a camera 140, an elevation angle acquisition unit 151 (an example of each of a first elevation-angle acquisition unit and a second elevation-angle acquisition unit), a coordinate acquisition unit 152, a distance estimation unit 153 (an example of each of first distance estimation unit and a second distance estimation unit), and a control unit 154. The array antenna 110 has a plurality of antenna elements 111 arranged two-dimensionally along an X-axis and a Y-axis, and transmits a power transmission signal to a power receiving antenna 51 disposed at a center of a position marker 52 that has the same size as the array antenna 110 in plan view and that is disposed facing the array antenna 110. The phase shifters 120 adjust phases of power transmission signals supplied to the plurality of antenna elements 111 in an X-axis direction and a Y-axis direction. The camera 140 acquires an image of the position marker 52 through a fisheye lens 141 disposed facing the position marker 52. Based on projection coordinates ($x_C$, $y_C$) obtained by projecting center coordinates ($T_X$, $T_Y$, $T_Z$) of the position marker 52 and a focal distance $f_L$ of the fisheye lens 141, the elevation angle acquisition unit 151 acquires a projected elevation angle $\theta_H$ obtained by projecting a first elevation angle $\theta_C$ and the first elevation angle $\theta_C$ of a marker center of the position marker 52 with respect to a Z-axis, onto a plane including the X-axis and the Z-axis. Further, the elevation angle acquisition unit 151 determines second elevation angles $\theta_T$, $\theta_B$, $\theta_L$ and $\theta_R$ of first endpoints 52L and 52R and second endpoints 52T and 52B with respect to the Z-axis, based on projection coordinates of the first endpoints 52L and 52R in the X-axis direction of the position marker 52 in the image, projection coordinates of the second endpoints 52T and 52B in the Y-axis direction of the position marker 52 in the image, and the focal length $f_L$ of the fisheye lens 141. The coordinate acquisition unit 152 determines a coordinate $T_Z$ of the position marker 52 with respect to the Z-axis, based on the projected elevation angle $\theta_H$, the projection coordinates ($x_C$, $y_C$) obtained by projecting the center coordinates ($T_X$, $T_Y$, $T_Z$) of the position marker 52, either of projection coordinates of the second endpoints 52T and 52B, and a length $T_h$ of the position marker 52 in a direction connecting the second endpoints 52T and 52B. Based on the first elevation angle $\theta_C$ and the coordinate $T_Z$ of the position marker 52 with respect to the Z-axis, the distance estimation unit 153 determines a first distance Rref between the marker center and the fisheye lens 141. Based on the second elevation angles $\theta_T$, $\theta_B$, $\theta_L$ and $\theta_R$ of the first endpoints 52L and 52R and the second endpoints 52T and 52B with respect to the Z-axis and the coordinate $T_Z$ of the position marker 52 with respect to the Z-axis, the distance estimation unit 153 determines second distances $R_T$, $R_B$, $R_L$, and $R_R$ between the first endpoints 52L and 52R and the second endpoints 52T and 52B, and the fisheye lens 141. The control unit 154 controls phase adjustment amounts by which the phase shifters 120 adjust the phases of the power transmission signals in the X-axis direction and the Y-axis direction. Based on path differences between the first distance Rref and the second distances $R_T$, $R_B$, $R_L$, and $R_R$, the control unit 154 sets phase adjustment amounts for three antenna elements 111 including antenna elements 111 at both ends in the X-axis direction and for three antenna elements 111 including antenna elements 111 at both ends in the Y-axis direction, and sets the phase adjustment amounts for the plurality of antenna elements 111 two-dimensionally arranged by parabolic interpolation of a quadratic function.

In this arrangement, path differences between the first distance Rref and the second distances $R_T$, $R_B$, $R_L$, and $R_R$ can be determined using the image of the position marker 52 having the same size as the array antenna 110 in plan view. Also, based on the path differences, phase adjustment amounts for the three antenna elements 111 including the antenna elements 111 at both ends in the X-axis direction and for the three antenna elements 111 including the antenna elements 111 at both ends in the Y-axis direction can be set, and the phase adjustment amounts for the plurality of antenna elements 111 arranged two-dimensionally by the parabolic interpolation of the quadratic function can be set.

With this approach, the antenna device 100A capable of easily calculating phase adjustment amounts of power transmission signals at a plurality of antenna elements 111 of the array antenna 110 according to a position of the power receiving antenna 51 so as to increase received power can be provided.

Further, a control unit 154 sets a phase adjustment amount for an antenna element 111 at a center of both ends in an X-axis direction, to match a first reference phase, sets phase adjustment amounts for antenna elements 111 at both ends in the X-axis direction, to phase adjustment amounts corresponding to path differences between second distances and a first distance for first endpoints 52L and 52R, sets a phase adjustment amount for an antenna element 111 at a center of both ends in a Y-axis direction, to match a second reference phase, and sets phase adjustment amounts for antenna elements 111 at both ends in the Y-axis direction, to phase adjustment amounts corresponding to path differences between second distances and the first distance for second endpoints 52T and 52B.

In this arrangement, by setting the phase adjustment amount for the antenna element 111 at the center in the X-axis direction to match the first reference phase; setting the phase adjustment amounts for the antenna elements 111 at both ends in the X-axis direction to the phase adjustment amounts corresponding to the path differences between the second distances and the first distance for the first endpoints 52L and 52R; setting the phase adjustment amount for the antenna element 111 at the center in the Y-axis direction to the second reference phase; and setting the phase adjustment amounts for the antenna elements 111 at both ends in the Y-axis direction to the phase adjustment amounts for the path differences between the second distances and the first distance for second endpoints 52T and 52B, it is possible to set the phase adjustment amounts corresponding to the path differences between the first distance Rref and the second distances $R_T$, $R_B$, $R_L$ and $R_R$. By setting phase adjustment amounts corresponding to path differences between the first distance Rref and second distances $R_L$ and $R_R$ to phase adjustment amounts for antenna elements 111 at both ends in the X-axis direction; setting phase adjustment amounts corresponding to path differences between the first distance Rref and second distances $R_T$ and $R_B$ to phase adjustment amounts for antenna elements 111 at both ends in the Y-axis direction; and setting phase adjustment amounts for antenna elements 111 at centers in the X-axis direction and the Y-axis direction to a first reference phase and a second reference phase, an antenna device 100A is capable of easily calculating phase adjustment amounts of power transmission signals at a plurality of antenna elements 111 of an array antenna 110 according to a position of a power receiving antenna 51, so as to increase power received more reliably.

A control unit 154 sets phase adjustment amounts for a plurality of antenna elements 111 by parabolic interpolation of a quadratic function in an X-axis direction in a case of setting a phase adjustment amount for an antenna element 111 at a center of both ends in the X-axis direction to match a first reference phase, and setting phase adjustment amounts for antenna elements 111 at both ends in the X-axis direction to phase adjustment amounts corresponding to path differences between second distances and a first distance for first endpoints 52L and 52R. The control unit 154 sets a phase adjustment amount for an antenna element 111 at a center of both ends in a Y-axis direction to match a second reference phase, and sets phase adjustment amounts for a plurality of antenna elements 111 by parabolic interpolation of a quadratic function in the Y-axis direction in a case of setting phase adjustment amounts for antenna elements 111 at both ends in the Y-axis direction to phase adjustment amounts corresponding to path differences between second distances and the first distance for second endpoints 52T and 52B. The phase adjustment amounts corresponding to the path differences between a first distance Rref and second distances $R_L$ and $R_R$ are set to phase adjustment amounts for the antenna elements 111 at both ends in the X-axis direction, and the phase adjustment amount for the antenna elements 111 at the center in the X-axis direction is set to match the first reference phase, and the phase adjustment amounts for the plurality of antenna elements 111 in the X-axis direction can be set to phase adjustment amounts optimized to increase received power by the parabolic interpolation of a quadratic function. Phase adjustment amounts corresponding to path differences between a first distance $R_{ref}$ and second distances $R_T$ and $R_B$ are set to phase adjustment amounts for antenna elements 111 at both ends in the Y-axis direction, and phase adjustment amounts for the antenna elements 111 at the centers in the X-axis direction and the Y-axis direction are set to match the first reference phase and the second reference phase, and the phase adjustment amount for the plurality of antenna elements 111 in the Y-axis direction can be set to phase adjustment amounts that are optimized to increase received power by parabolic interpolation of a quadratic function.

Moreover, a first reference phase and a second reference phase are zero. In this arrangement, calculation by parabolic interpolation of a quadratic function is further facilitated, and phase adjustment amounts of power transmission signals to be supplied to antenna elements 111 can be more easily determined, and received power at the power receiving antenna 51 can be increased.

In addition, a plurality of antenna elements 111 arranged two-dimensionally are arranged in odd numbers along each of an X-axis and a Y-axis. In this arrangement, calculation by parabolic interpolation of a quadratic function is made easier by utilizing a symmetry with respect to the antenna element 111 located at the center in an X direction and a Y direction, and phase adjustment amounts for power transmission signals supplied to antenna elements 111 can be more easily calculated, thereby increasing received power at the power receiving antenna 51.

Moreover, the parabolic interpolation of a quadratic function is interpolation of a quadratic function. In this arrangement, phase adjustment amounts for power transmission signals supplied to antenna elements 111 located between antenna elements 111 at both ends can be easily determined by the interpolation of the quadratic function, thereby increasing received power at the power receiving antenna 51.

A power feeding apparatus 100 includes an array antenna 110, a microwave generator 130, phase shifters 120, a camera 140, an elevation angle acquisition unit 151 (an example of a first elevation-angle acquisition unit and a second elevation-angle acquisition unit), a coordinate acquisition unit 152, a distance estimation unit 153 (an example of a first distance estimation unit and a second distance estimation unit), and a control unit 154. The array antenna 110 has a plurality of antenna elements 111 arranged two-dimensionally along an X-axis and a Y-axis, and transmits a power transmission signal to a power receiving antenna 51 configured to be disposed at the center of a position marker 52 that has the same size as the array antenna 110 in plan view and that is disposed facing the array antenna 110. The phase shifters 120 are provided between the array antenna 110 and the microwave generator 130, and adjust phases of power transmission signals supplied from the microwave generator 130 to the plurality of antenna elements 111 in an X-axis direction and a Y-axis direction. The camera 140 acquires an image of the position marker 52 through a fisheye lens 141 disposed facing the position marker 52. Based on projection coordinates ($x_C$, $y_C$) obtained by projecting center coordinates ($T_X$, $T_Y$, $T_Z$) of the position marker 52 and a focal distance $f_L$ of the fisheye lens 141, the elevation angle acquisition unit 151 acquires a first elevation angle $\theta_C$ of a marker center of the position marker 52 with respect to a Z-axis; and a projected elevation angle $\theta_H$ obtained by projecting the first elevation angle $\theta_C$ onto a plane including the X-axis and the Z-axis. The elevation angle acquisition unit 151 determines second elevation angles $\theta_T$, $\theta_B$, $\theta_L$, and $\theta_R$ of the first endpoints 52L and 52R and the second endpoints 52T and 52B with respect to the Z-axis, based on coordinates of the first endpoints 52L and 52R in the X-axis direction of the position marker 52 in the image of the position marker 52; coordinates of the second endpoints 52T and 52B in the Y-axis direction of the position marker 52 in the image of the position marker 52; and the focal distance of the fisheye lens 141. The coordinate acquisition unit 152 determines a coordinate $T_Z$ of the position marker 52 along the Z-axis based on: the projected elevation angle $\theta_H$; the projection coordinates ($x_C$, $y_C$) obtained by projecting the center coordinates ($T_X$, $T_Y$, $T_Z$) of the position marker 52; either of the projection coordinates of the second endpoints 52T and 52B; and a length $T_h$ of the position marker 52 in a direction connecting the second endpoints 52T and 52B. The distance estimation unit 153 determines a first distance Rref between the marker center and the fisheye lens 141 based on the first elevation angle $\theta_C$ and the coordinate $T_Z$ of the position marker 52 along the Z-axis. The distance estimation unit 153 determines second distances $R_T$, $R_B$, $R_L$ and $R_R$ between the first endpoints 52L and 52R and the second endpoints 52T and 52B, and the fisheye lens 141 based on the second elevation angles $\theta_T$, $\theta_B$, $\theta_L$, and $\theta_R$ of the first endpoints 52L and 52R and the second endpoints 52T and 52B with respect to the Z-axis, and on the coordinate $T_Z$ of the position marker 52 along the Z-axis. The control unit 154 sets phase adjustment amounts for three antenna elements 111 including antenna elements 111 at both ends in the X-axis direction and for three antenna elements 111 including antenna elements 111 at both ends in the Y-axis direction, based on the path differences between the first distance Rref and the second distances $R_T$, $R_B$, $R_L$, and $R_R$, and sets the phase adjustment amounts for the plurality of antenna elements 111 arranged two-dimensionally by the parabolic interpolation of a quadratic function.

In this arrangement, it is possible to provide a power feeding apparatus 100 capable of easily calculating phase adjustment amounts of power transmission signals at a plurality of antenna elements 111 of an array antenna 110 according to a position of the power receiving antenna 51 so as to increase received power.

A power feeding apparatus 100 used in a power feeding method includes an array antenna 110, a microwave generator 130, phase shifters 120, a camera 140, an elevation angle acquisition unit 151 (an example of a first elevation-angle acquisition unit and a second elevation-angle acquisition unit), a coordinate acquisition unit 152, a distance estimation unit 153 (an example of a first distance estimation unit and a second distance estimation unit), and a control unit 154. The array antenna 110 is an array antenna 110 having a plurality of antenna elements 111 arranged two-dimensionally along an X-axis and a Y-axis, and transmits a power transmission signal to a power receiving antenna 51 configured to be disposed at the center of a position marker 52 that has the same size as the array antenna 110 in plan view and that is disposed facing the array antenna 110. The phase shifters 120 are provided between the array antenna 110 and the microwave generator 130, and adjust phases of power transmission signals supplied from the microwave generator 130 to the plurality of antenna elements 111 in an X-axis direction and a Y-axis direction. The camera 140 acquires an image of the position marker 52 through a fisheye lens 141 disposed facing the position marker 52. Based on projection coordinates ($x_C$, $y_C$) obtained by projecting the center coordinates ($T_X$, $T_Y$, $T_Z$) of the position marker 52, and a focal distance $f_L$ of the fisheye lens 141, the elevation angle acquisition unit 151 acquires a first elevation angle $\theta_C$ of the marker center of the position marker 52 with respect to the z-axis, and a projected elevation angles $\theta_H$ obtained by projecting the first elevation angle $\theta_C$ onto a plane including the X-axis and the Z-axis. Further, the elevation angle acquisition unit 151 determines second elevation angles $\theta_T$, $\theta_B$, $\theta_L$, and $\theta_R$ of the first endpoints 52L and 52R and the second endpoints 52T and 52B with respect to the Z-axis, based on: the coordinates of the first endpoints 52L and 52R in the X-axis direction of the position marker 52 in the image of the position marker 52; the coordinates of the second endpoints 52T and 52B in the Y-axis direction of the position marker 52 in the image of the position marker 52; and the focal distance of the fisheye lens 141. The coordinate acquisition unit 152 determines a coordinate $T_Z$ of the position marker 52 along the Z-axis based on the projected elevation angle $\theta_H$; the projection coordinates ($x_C$, $y_C$) obtained by projecting the center coordinates ($T_X$, $T_Y$, $T_Z$) of the position marker 52; either of the projection coordinates of the second endpoints 52T and 52B; and a length $T_h$ of the position marker 52 in a direction connecting the second endpoints 52T and 52B. The distance estimation unit 153 determines a first distance Rref between the center of the marker and the fisheye lens 141, based on the first elevation angle $\theta_C$ and the coordinate $T_Z$ of the position marker 52 along the Z-axis. The distance estimation unit 153 determines second distances $R_T$, $R_B$, $R_L$, and $R_R$ between the first endpoints 52L and 52R and the second endpoints 52T and 52B, and the fisheye lens 141, based on the second elevation angles $\theta_T$, $\theta_B$, $\theta_L$, and $\theta_R$ of the first endpoints 52L, 52R and the second endpoints 52T and 52B with respect to the Z-axis, and the coordinate $T_Z$ of the position marker 52 along the Z-axis. The power feeding method includes setting phase adjustment amounts for three antenna elements 111 including antenna elements 111 at both ends in the X-axis direction and for three antenna elements 111 including antenna elements 111 at both ends in the Y-axis direction, based on path differences between the first distance Rref and second distances $R_T$, $R_B$, $R_L$, and $R_R$, and setting the phase adjustment amounts for the plurality of antenna elements 111 arranged two-dimensionally by parabolic interpolation of a quadratic function.

With this approach, it is possible to provide a power feeding method capable of easily calculating phase adjustment amounts of power transmission signals at a plurality of antenna elements 111 of an array antenna 110 according to a position of a power receiving antenna 51 so as to increase received power.

Although the antenna device, the power feeding apparatus, and power supply method of the exemplary embodiment of the present disclosure have been described above, the present disclosure is not limited to the specifically disclosed embodiments, and modifications and changes can be made without departing from the scope of the claims.

This international application claims priority to Japanese Patent Application No. 2022-140825, filed on Sep. 5, 2022, the entire contents of which are incorporated herein by reference.

Reference Signs List

50 power receiving device
51 power receiving antenna
52 position marker
100 antenna device
100A power feeding apparatus
110 array antenna
111 antenna element
120 phase shifter
130 microwave generator
140 camera
141 fisheye lens
142 camera body
150 controller
150A memory

The invention claimed is:

1. An antenna device comprising:

an array antenna including a plurality of antenna elements arranged two-dimensionally along a first axis and a second axis, the array antenna being configured to transmit a power transmission signal to a power receiving antenna that is configured to be disposed at a center of a marker, which is disposed facing the array antenna and has a same size as the array antenna in plan view;

phase shifters configured to adjust phases of power transmission signals that are supplied to the plurality of antenna elements in a first axis direction and a second axis direction;

a camera configured to acquire an image of the marker through a fisheye lens disposed facing the marker;

circuitry configured to;

acquire a first elevation angle of a marker center of the marker with respect to a third axis, and a projected elevation angle obtained by projecting the first elevation angle onto a plane including the first axis and the third axis, based on a marker image center that is the center of the marker in a marker image, and a focal distance of the fisheye lens;

determine second elevation angles of first endpoints and second endpoints with respect to a third axis, based on coordinates of the first endpoints of the marker in the marker image, coordinates of the second endpoints of the marker in the marker image, and the focal distance of the fisheye lens;

determine a coordinate of the marker along the third axis based on the projected elevation angle; the marker image center that is the center of the marker in the marker image; either of projection coordinates of the second endpoints; and a length of the marker in a direction connecting the second endpoints;

determine a first distance between the marker center and the fisheye lens, based on the first elevation angle and the coordinate of the marker along the third axis;

determine second distances between:

the fisheye lens, and the first endpoints and the second endpoints; and control the phase adjustment amounts by which the phase shifters adjust the phases of the power transmission signals in the first axis direction and the second axis direction, wherein the circuitry is configured to:

set phase adjustment amounts for three antenna elements including antenna elements at both ends in the first axis direction and for three antenna elements including antenna elements at both ends in the second axis direction, based on the path differences between the first distance and the second distances, and set the phase adjustment amounts for the plurality of antenna elements arranged two-dimensionally by parabolic interpolation of a quadratic function.

2. The antenna device according to claim 1, wherein the circuitry is configured to:

set a phase adjustment amount for an antenna element at a center of both ends in the first axis direction to match a first reference phase, set phase adjustment amounts for the antenna elements at both ends in the first axis direction, to phase adjustment amounts corresponding to the path differences between the second distances and the first distance for the first endpoints, set the phase adjustment amount for the antenna element at a center of the both ends in the second axis direction to match a second reference phase, and set the phase adjustment amounts for the antenna elements at both ends in the second axis direction to phase adjustment amounts corresponding to the path differences between the second distances and the first distance for the second endpoints.

3. The antenna device according to claim 2, wherein the circuitry is configured to:

set the phase adjustment amounts for given antenna elements by the parabolic interpolation of the quadratic function in the first axis direction, in a state where the circuitry sets the phase adjustment amount for the antenna element at the center of the both ends in the first axis direction to match the first reference phase, and set the phase adjustment amounts for the antenna elements at the both ends in the first axis direction to the phase adjustment amounts corresponding to the path differences between the second distances and the first distance for the first endpoints, and set the phase adjustment amounts for given antenna elements by the parabolic interpolation of the quadratic function in the second axis direction, in a state where the circuitry sets the phase adjustment amount for the antenna element at the center of the both ends in the second axis direction to match the second reference phase, and set the phase adjustment amounts for the antenna elements at the both ends in the second axis direction to the phase adjustment amounts corresponding to the path differences between the second distances and the first distance for the second endpoints.

4. The antenna device according to claim 3, wherein the first reference phase and the second reference phase are zero.

5. The antenna device according to claim 1, wherein the plurality of antenna elements arranged two-dimensionally are arranged in odd numbers along the first axis and the second axis.

6. The antenna device according to claim 5, wherein the parabolic interpolation of the quadratic function is internal interpolation of a quadratic function.

7. A power feeding apparatus comprising:

an array antenna including a plurality of antenna elements arranged two-dimensionally along a first axis and a second axis, the array antenna being configured to transmit a power transmission signal to a power receiving antenna that is configured to be disposed at a center of a marker, which is disposed facing the array antenna and has a same size as the array antenna in plan view;

a radio wave generator;

phase shifters disposed between the array antenna and the radio wave generator, and configured to adjust phases of power transmission signals supplied from the radio wave generator to the plurality of antenna elements in a first axis direction and a second axis direction;

a camera configured to acquire an image of the marker through a fisheye lens disposed facing the marker; and circuitry configured to;

acquire a first elevation angle of a marker center of the marker with respect to a third axis, and a projected elevation angle obtained by projecting the first elevation angle onto a plane including the first axis and the third axis, based on an marker image center that is the center of the marker in a marker image, and a focal distance of the fisheye lens;

determine second elevation angles of first endpoints and second endpoints with respect to a third axis, based on coordinates of the first endpoints of the marker in the marker image, coordinates of the second endpoints of the marker in the marker image, and the focal distance of the fisheye lens;

determine a coordinate of the marker along the third axis based on the projected elevation angle; the marker image center that is the center of the marker in the marker image; either of projection coordinates of the second endpoints; and a length of the marker in a direction connecting the second endpoints;

determine a first distance between the marker center and the fisheye lens, based on the first elevation angle and the coordinate of the marker along the third axis;

determine second distances between:

the fisheye lens, and the first endpoints and the second endpoints; and control phase adjustment amounts by which the phase shifters adjust the phases of the power transmission signals in the first axis direction and the second axis direction, wherein the circuitry is configured to:

set phase adjustment amounts for three antenna elements including antenna elements at both ends in the first axis direction and for three antenna elements including antenna elements at both ends in the second axis direction, based on path differences between the first distance and the second distances, and set the phase adjustment amounts for the plurality of antenna elements arranged two-dimensionally by parabolic interpolation of a quadratic function.

8. A power feeding method by:

an array antenna including a plurality of antenna elements arranged two-dimensionally along a first axis and a second axis, the array antenna being configured to transmit a power transmission signal to a power receiving antenna that is configured to be disposed at a center of a marker, which is disposed facing the array antenna and has a same size as the array antenna in plan view;

a radio wave generator;

phase shifters disposed between the array antenna and the radio wave generator and configured to adjust phases of power transmission signals supplied from the radio wave generator to the plurality of antenna elements in a first axis direction and a second axis direction;

a camera configured to acquire an image of the marker through a fisheye lens disposed facing the marker; and circuitry configured to;

acquire a first elevation angle of a marker center of the marker with respect to a third axis, and a projected elevation angle obtained by projecting the first elevation angle onto a plane including the first axis and the third axis, based on an marker image center that is the center of the marker in a marker image, and a focal distance of the fisheye lens;

determine second elevation angles of first endpoints and second endpoints with respect to the third axis, based on coordinates of the first endpoints of the marker in the marker image, coordinates of the second endpoints of the marker in the marker image, and the focal distance of the fisheye lens;

determine a coordinate of the marker along the third axis based on the projected elevation angle; the marker image center that is the center of the marker in the marker image; either of projection coordinates of the second endpoints; and a length of the marker in a direction connecting the second endpoints;

determine a first distance between the marker center and the fisheye lens, based on the first elevation angle and the coordinate of the marker along the third axis; and determine second distances between:

the fisheye lens, and the first endpoints and the second endpoints, the power feeding method comprising:

controlling phase adjustment amounts by which the phase shifters adjust the phases of the power transmission signals in the first axis direction and the second direction;

setting phase adjustment amounts for three antenna elements including antenna elements at both ends in the first axis direction and for three antenna elements including antenna elements at both ends in the second axis direction, based on path differences between the first distance and the second distances; and setting the phase adjustment amounts for the plurality of antenna elements arranged two-dimensionally by parabolic interpolation of a quadratic function.

* * * * *